United States Patent
Kim et al.

(10) Patent No.: US 11,579,096 B2
(45) Date of Patent: Feb. 14, 2023

(54) WAFER INSPECTION APPARATUS AND METHOD

(71) Applicant: SAMSUNG ELECTRONICS CO., LTD., Suwon-si (KR)

(72) Inventors: Sungha Kim, Suwon-si (KR);
Hyounggon Kim, Bucheon-si (KR);
Doohyun Cho, Hwaseong-si (KR);
Kwangsung Lee, Yongin-si (KR);
Jongsu Kim, Seongnam-si (KR);
Taejoong Kim, Hwaseong-si (KR);
Jeongsu Ha, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 103 days.

(21) Appl. No.: 17/116,708

(22) Filed: Dec. 9, 2020

(65) Prior Publication Data
US 2021/0341396 A1    Nov. 4, 2021

(30) Foreign Application Priority Data
Apr. 29, 2020    (KR) .................. 10-2020-0052419

(51) Int. Cl.
*G01N 21/95*    (2006.01)
*G01B 11/06*    (2006.01)

(52) U.S. Cl.
CPC ..... *G01N 21/9501* (2013.01); *G01B 11/0616* (2013.01)

(58) Field of Classification Search
CPC ............ G01B 2210/56; G01B 11/0625; G01B 11/06; G01B 11/00; G01B 11/0641; G01B 11/0683; G01B 11/0616; G01B 11/0633; G01B 21/08; G01N 21/211; G01N 21/4738; G01N 21/9501; G01N 21/8851; G01N 2021/8427; G01N 21/55; G01N 21/8422; G01N 2021/8887; G01N 21/3563; G01N 2201/0221; G01N 2021/3595;
(Continued)

(56) References Cited

U.S. PATENT DOCUMENTS 7,580,129 B2    8/2009    Yu et al.
10,056,277 B2    8/2018    Kobayashi et al.
(Continued)

FOREIGN PATENT DOCUMENTS

CN    108571933 A    *    9/2018
JP    2021148791 A    *    9/2021    ......... G01B 11/0625
(Continued)

*Primary Examiner* — Michael P Stafira
(74) *Attorney, Agent, or Firm* — Sughrue Mion, PLLC

(57) ABSTRACT

A thickness estimating apparatus includes a transfer robot, a light source, a camera, a memory and a controller. The memory stores a thickness predicting model generated based on a data set including a thickness of at least one of a test wafer corresponding to the wafer or a test element layer formed on the test wafer, and the thickness predicting model being trained to minimize a loss function of the data set. The controller applies pixel data, which is acquired from at least one pixel selected from a plurality of pixels included in a captured image, to the thickness predicting model, to predict a thickness of at least one of the wafer or an element layer formed on the wafer in a position corresponding to a position of the selected pixel.

20 Claims, 17 Drawing Sheets

(58) Field of Classification Search
CPC ..... G01N 2021/8433; G01N 2201/129; G01N 31/00; G01N 2021/8883; G01N 21/21; G01N 21/31; G01N 21/3581; G01N 2201/061; G01N 2201/12; G01N 33/32
See application file for complete search history.

(56) References Cited

U.S. PATENT DOCUMENTS

| | | |
|---|---|---|
| 10,325,364 B2 | 6/2019 | Benvegnu |
| 2015/0324970 A1* | 11/2015 | Iwanaga ................... G06T 7/60 382/145 |
| 2017/0061604 A1* | 3/2017 | Pandev .................. G06V 20/66 |
| 2017/0200265 A1* | 7/2017 | Bhaskar .................... G03F 1/86 |
| 2018/0252514 A1* | 9/2018 | Pandev ............... G03F 7/70616 |
| 2019/0033211 A1* | 1/2019 | Neil ...................... G01N 21/211 |
| 2019/0073566 A1* | 3/2019 | Brauer ................... G06V 10/82 |
| 2019/0160626 A1 | 5/2019 | Watanabe et al. |
| 2019/0323973 A1 | 10/2019 | Jung et al. |
| 2020/0033723 A1* | 1/2020 | Yang ....................... H01L 22/10 |
| 2020/0284733 A1* | 9/2020 | Sapiens .............. G01B 11/0633 |
| 2021/0262781 A1* | 8/2021 | Tadokoro ............. G01B 11/046 |

FOREIGN PATENT DOCUMENTS

| | | | |
|---|---|---|---|
| KR | 10-2007-0076276 A | 7/2007 | |
| KR | 10-1582357 B1 | 1/2016 | |
| WO | WO-2019191342 A1 * | 10/2019 | ......... G01N 21/8806 |

\* cited by examiner

WAFER INSPECTION APPARATUS AND METHOD

CROSS-REFERENCE TO RELATED APPLICATION(S)

This application claims priority to Korean Patent Application No. 10-2020-0052419 filed on Apr. 29, 2020 in the Korean Intellectual Property Office, the disclosure of which is incorporated herein by reference in its entirety.

BACKGROUND

Example embodiments consistent with the present disclosure relate to a wafer inspection apparatus and a wafer inspection method.

A semiconductor production line may include process chambers for performing various semiconductor processes, and a chemical/mechanical polishing (CMP) process, a deposition process, an etching process, or the like may be performed in the process chambers. When the semiconductor process is completed in each of the process chambers, an inspection process for determining whether the semiconductor process has been correctly performed may be performed. In general, the inspection process may be carried out by transferring a wafer in which the semiconductor process is completed to an Optical Critical Dimension Integrated Metrology (OCD IM) facility or the like for measuring a thickness of the wafer. In this way, since a separate period of time and space may be required to proceed with the inspection process, productivity may decrease and costs may increase.

SUMMARY

Example embodiments provide an inspection apparatus and an inspection method, estimating a thickness of a wafer and/or a thickness of an element layer formed on the wafer in a desired position using a captured image of the wafer, to quickly determine whether a process is proceeding normally, and feeding back inspection results to a process facility to improve a yield in production.

According to an aspect of an example embodiment, there is provided a thickness estimating apparatus comprising: a transfer robot configured to transfer a wafer between a first device and a second device along a transfer path; a light source configured to emit light onto the wafer while on the transfer path; a camera configured to acquire an original image of the wafer based on the light reflected from the wafer; a memory configured to store a thickness predicting model, the thickness predicting model being generated based on a data set including a thickness of at least one of a test wafer corresponding to the wafer and a test element layer formed on the test wafer, and the thickness predicting model being trained to minimize a loss function of the data set; and a controller configured to apply pixel data, which is acquired from at least one pixel selected from a plurality of pixels included in a corrected image generated based on the original image, to the thickness predicting model, to predict a thickness of at least one of the wafer or an element layer formed on the wafer in a position corresponding to a position of the selected pixel.

According to an aspect of an example embodiment, there is provided a thickness estimating apparatus comprising: a transfer robot configured to transfer at least one test wafer between a first device and a second device along a transfer path; a light source configured to emit light onto the test wafer while on the transfer path; a camera configured to acquire a test image of the test wafer based on the light reflected from the wafer; a controller configured to generate a thickness predicting model using machine learning, based on a data set including an actual thickness of at least one of the test wafer and a test element layer formed on the test wafer, respectively acquired in a plurality of test positions on the test wafer, and test pixel data of each of test pixels in positions corresponding to the plurality of test positions in the test image of the test wafer; and a memory configured to store the thickness predicting model.

According to an aspect of an example embodiment, there is provided a thickness estimation method comprising: measuring a thickness of at least one of a test wafer and a test element layer formed on the test wafer in each of a plurality of test positions on the test wafer; acquiring test pixel data of each test pixel in positions corresponding to the plurality of test positions in a test image of the test wafer; generating a data set including the test pixel data, and a thickness of at least one of the test wafer and the test element layer measured in the plurality of test positions; generating a thickness predicting model based on the data set, and using machine learning to train the thickness predicting model, to minimize a loss function of the data set; acquiring an original image of a wafer; acquiring a corrected image of the wafer based on the original image; acquiring pixel data of at least one pixel selected in a position corresponding to at least one selected position of the wafer, from the corrected image; and applying the pixel data to the thickness predicting model, to predict a thickness of at least one of the wafer and an element layer formed on the wafer in the at least one selected position.

BRIEF DESCRIPTION OF DRAWINGS

The above and other aspects, features, and advantages of example embodiments will be more clearly understood from the following detailed description, taken in conjunction with the accompanying drawings, in which.

DETAILED DESCRIPTION

Hereinafter, example embodiments will be described with reference to the accompanying drawings.

Figure 1:
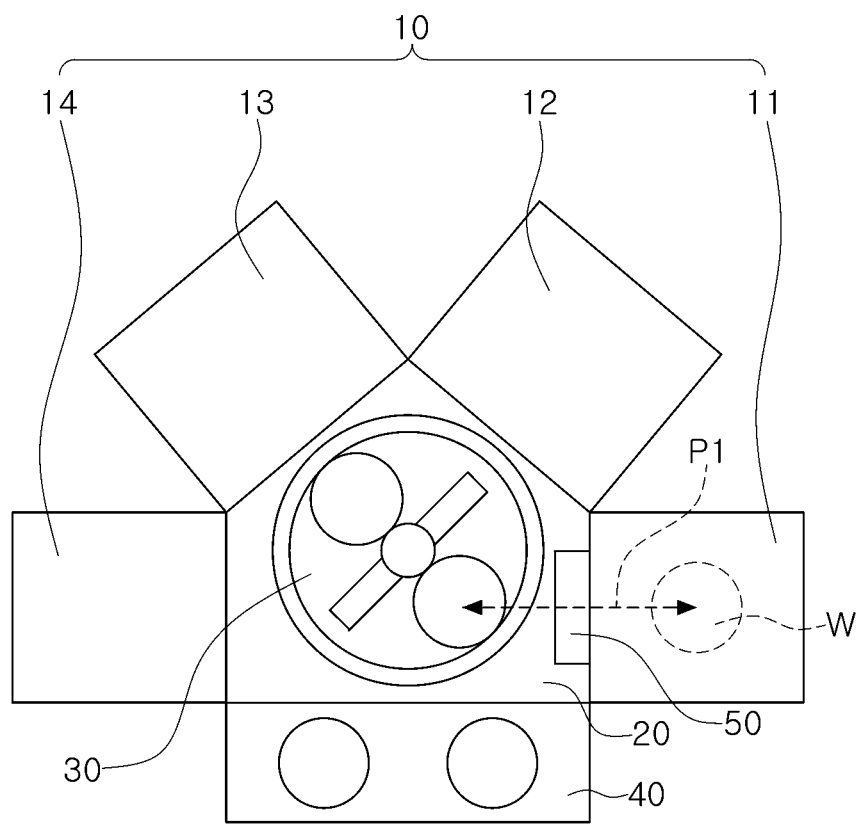
FIG. 1 is a schematic configuration diagram illustrating semiconductor processing equipment including a thickness estimating apparatus according to an example embodiment.

FIG. 1 is a schematic configuration diagram illustrating semiconductor processing equipment including a thickness estimating apparatus according to an example embodiment.

Referring to FIG. 1, semiconductor processing equipment 1 according to an example embodiment may include a plurality of process chambers 10. For example, the process chambers 10 may include a first process chamber 11, a second process chamber 12, a third process chamber 13 and a fourth process chamber 14. Although four process chambers 11 to 14 are illustrated in FIG. 1, the inventive concept is not limited thereto, and therefore, according to another embodiment of the inventive concept, the number of process chambers may be greater than four or greater than four. According to an example embodiment, the process chambers 11 to 14 may include a deposition process chamber for performing a deposition process, a polishing process chamber for performing a CMP process, and an etching process chamber for using a plasma and/or an etching solution containing radicals and ions of a source gas, and the like, to remove at least a portion of a wafer W and/or element layers formed on the wafer W.

The wafer W may be a semiconductor substrate including a semiconductor material, and the element layers including at least one of semiconductor elements, wiring patterns connected to the semiconductor elements, or insulating layers covering the semiconductor elements and the wiring patterns may be formed on the wafer W. For example, the semiconductor processing equipment 1 including the plurality of process chambers 11 to 14 may apply various semiconductor processes such as a deposition process, a photo process, an etching process, and a polishing process to a process a target such as a wafer or the like, and the semiconductor processes may form various structures on the wafer W to implement a semiconductor device to be desired.

For example, the plurality of process chambers 11 to 14 may receive the wafer W by a transfer chamber 20 and a load lock chamber 40 to perform a semiconductor process. The transfer chamber 20 and the load lock chamber 40 may include a transfer robot 30, and the transfer robot 30 of the transfer chamber 20 and the load lock chamber 40 may transfer the wafer W, which may be a process target. For example, the transfer robot 30 of the transfer chamber 20 may take a process target such as the wafer W from the load lock chamber 40 and may transfer the process target to one of the plurality of process chambers 11 to 14, or may transfer the wafer W between the plurality of process chambers 11 to 14. In an embodiment, the transfer robot 30 may be a handler. The transfer robot 30 may include a chuck for fixing the process target, and a plurality of protrusions contacting the process target on an upper portion of the chuck. The transfer robot 30 may further include a linear stage for transferring the wafer W.

Referring to FIG. 1, the transfer robot 30 of the transfer chamber 20 according to an example embodiment may take the wafer W out of the load lock chamber 40 and transfer the wafer W to the transfer chamber 20, and may transfer the wafer W, which may be a process target, from the transfer chamber 20 to the process chamber 11 along a predetermined transfer path P1. The process target is not limited to the wafer W, and as such, according to other embodiments, various substrates other than the wafer W, for example, a mother substrate for display may be provided as the process target.

A thickness estimating apparatus according to an example embodiment may generate a thickness predicting model by a machine learning technique prior to an actual process, to determine whether the semiconductor process is properly performed in each of the plurality of process chambers 11 to 14. For example, a thickness estimating apparatus according to an example embodiment may be implemented as an apparatus, which may be distinguished from an apparatus for generating the thickness predicting model by the machine learning technique. In this case, the previously generated thickness predicting model may be stored in a memory of the thickness estimating apparatus.

In an example embodiment, the thickness predicting model may be generated based on a thickness of at least one of the wafer W and the element layer, and pixel data of each of pixels obtained from a captured wafer image. For example, the pixel data may be RGB values of each of the pixels. An actual thickness of at least one of the wafer W and the element layer formed on the wafer W may be measured by a spectrum-based measurement method using a spectroscopic ellipsometer (SE). A thickness estimating apparatus according to an example embodiment may acquire a wafer image by capturing a wafer W in which a process may be completed, and apply pixel data obtained from the wafer image to a thickness predicting model. The thickness predicting model may be used to estimate a thickness of at least one of the wafer W and/or the element layer formed on the wafer W in which the process is completed, and to confirm process results therefrom.

For example, the process chamber 11 may be a chemical-mechanical polishing (CMP) process facility. When a degree for polishing the wafer W is not normally controlled in a CMP process, a defect may occur in the semiconductor device to be manufactured in the wafer W. A thickness estimating apparatus according to an example embodiment may measure a thickness of the wafer W, which may be the process target, and/or a thickness of the element layer formed on the wafer W, and may determine whether the CMP process has been normally performed, while the wafer W is transferred along the transfer path P1 between the process chamber 11 and the transfer chamber 20 by the transfer robot 30.

In an example embodiment, pixel data of each pixels obtained from a wafer image of the wafer W may be input into the thickness predicting model, to calculate a thickness of the wafer W, which may be a target of the CMP process, and/or a thickness of the element layer. A thickness of a target of the CMP process calculated by the thickness predicting model may be compared with a thickness of the target set in the CMP process, to determine whether the CMP process has been properly performed.

A thickness predicting model according to an example embodiment may be generated based on a machine learning technique of non-linear regression analysis using various algorithms. The thickness estimating apparatus may apply data obtained from an image of the wafer W to the thickness predicting model without a separate processing process, to estimate a thickness of the wafer W and/or a thickness of the element layer formed on the wafer W. Therefore, the thickness may be quickly measured in a wider range, as compared to the spectrum-based measurement method generally used for thickness measurement, and production delay due to an inspection process performed after the semiconductor process may be minimized.

In an example embodiment, an optical system 50 may be disposed in the semiconductor processing equipment 1. The optical system 50 may be disposed adjacent to (e.g., above) the transfer path P1, and may capture an image of the wafer W moving along the transfer path P1. The image obtained by the optical system 50 capturing the wafer W may be used by the thickness estimating apparatus to estimate a thickness of the wafer W and/or a thickness of the element layer formed on the wafer W.

For example, in an example embodiment, an image of the wafer W may be acquired by capturing the wafer W, when the wafer W is on the transfer path P1 before and after performing the semiconductor process, without a separate stage for capturing the image of the wafer W. Therefore, since an operation of capturing the image by transferring the wafer W to the separate stage may be omitted, efficiency of the process may increase and production costs may be reduced.

Figure 2:
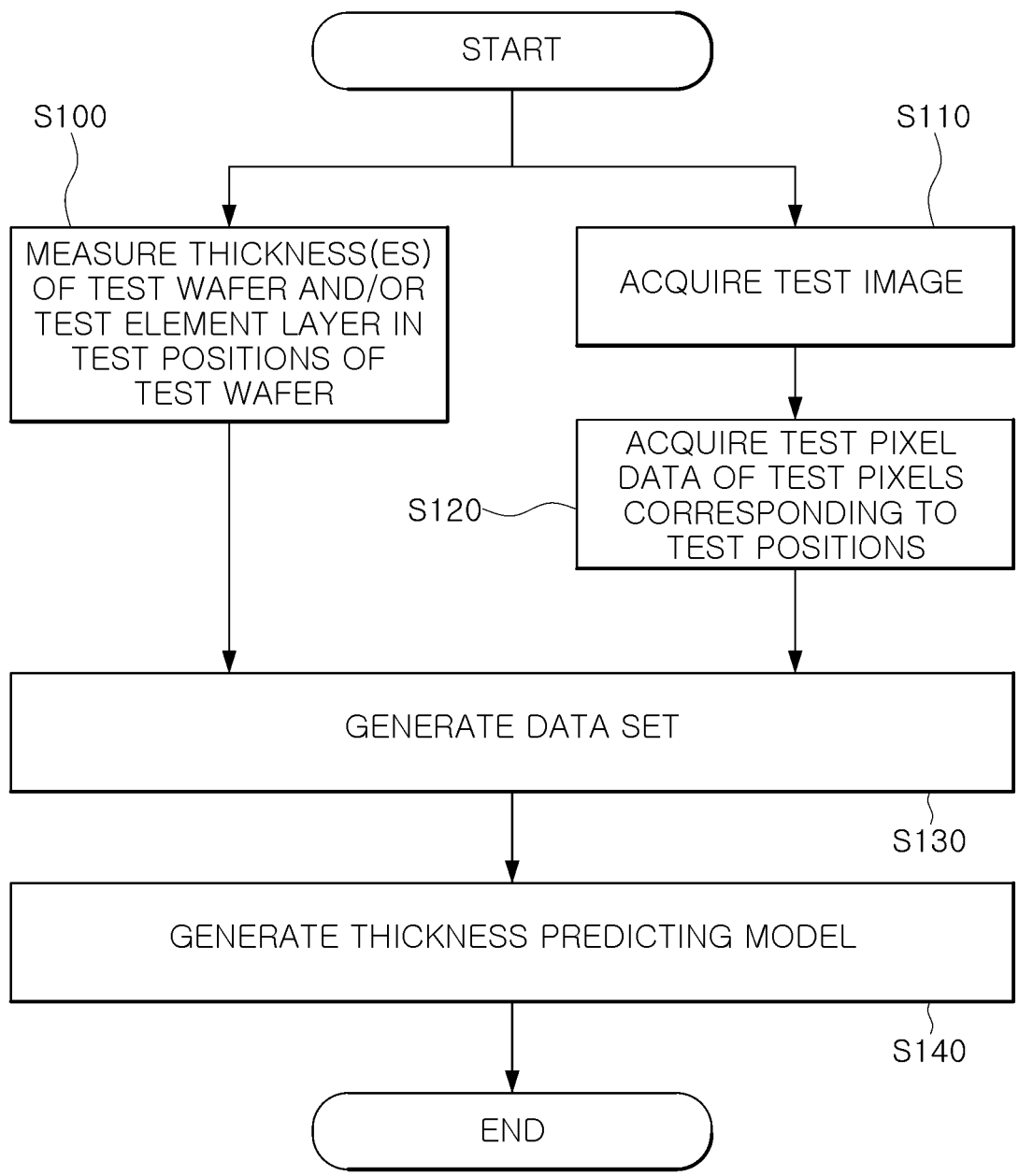
FIG. 2 is a flowchart illustrating a process of generating a thickness predicting model in a thickness estimating apparatus according to an example embodiment.
Figure 3:
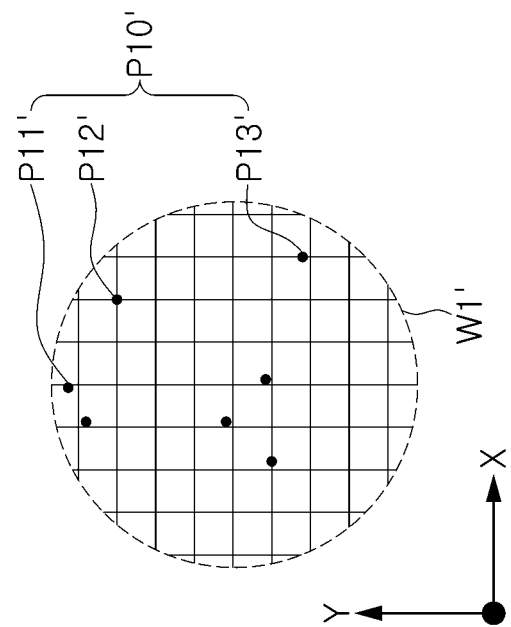
FIG. 3 is a view illustrating a test wafer and a test image for generating a thickness predicting model in a thickness estimating apparatus according to an example embodiment.
Figure 3:
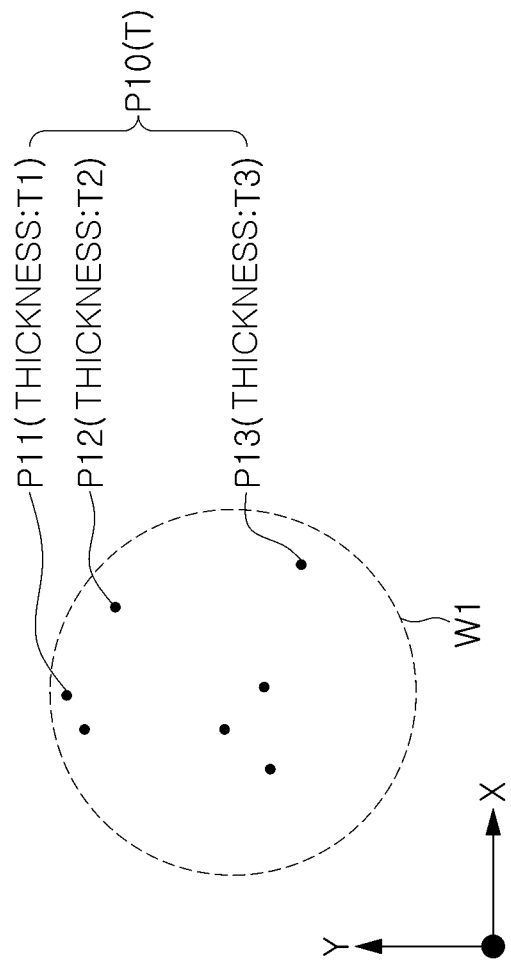

FIG. 2 is a flowchart illustrating a process of generating a thickness predicting model in a thickness estimating apparatus according to an example embodiment, and FIG. 3 is a view illustrating a test wafer and a test image for generating a thickness predicting model in a thickness estimating apparatus according to an example embodiment.

Referring to FIGS. 2 and 3 together, a thickness estimating apparatus according to an example embodiment may generate a thickness predicting model using a test wafer W1. In an embodiment, at least one test element layer may be formed on the test wafer W1 by a semiconductor process. The test element layer may be a layer formed on the test wafer, and may include at least one of semiconductor elements, wiring patterns for connecting the semiconductor elements, or insulating layers covering the semiconductor elements and the wiring patterns. The test wafer W1 and the test element layer may respectively correspond to a wafer of which a thickness is estimated using the thickness predicting model, and an element layer formed on the wafer.

First, in order to generate the thickness predicting model, thicknesses T1, T2, and T3 of the test wafer W1 and/or the test element layer in a plurality of test positions P11, P12, and P13 selected from the test wafer W1 may be measured (S100). The test positions P11, P12, and P13 may be positions determined to confirm results of the semiconductor process performed on the test wafer W1. For example, the plurality of test positions P11, P12, and P13 may be optionally selected by a user. The thicknesses T1, T2, and T3 of the test wafer W1 or the test element layer measured in the plurality of test positions P11, P12, and P13 may be different from each other. For example, a thickness T of the test wafer W1 and/or the test element layer may be measured by a spectrum-based measurement method using a spectroscopic ellipsometer. Although three positions P11, P12 and P13 are illustrated in FIG. 3, the number of positions is not limited thereto, and as such, according to another embodiment, the number or positions may be different than three.

In addition, separately from the measurement of the thickness of the test wafer W1 and/or the test element layer, an optical system may be used to capture the test wafer W1 to acquire a test image W1' (S110). The optical system may be the same equipment as the optical system 50 included in the semiconductor processing equipment 1 in which the semiconductor process is actually performed in the embodiment illustrated in FIG. 1. According to one or more example embodiments, the test image W1' capturing the test wafer W1 may also be acquired by using a separate device, different from the optical system 50 of the semiconductor processing equipment 1 according to an embodiment described with reference to FIG. 1.

Next, test pixel data may be acquired from test pixels P10' selected from pixels included in the test image W1' (S120). The test pixels P10' may be pixels in positions corresponding to selected test positions P10 on the test wafer W1. For example, the test pixel data may include RGB values of the test pixels. According to one or more example embodiments, at least one of capturing the test image W1' (i.e., operation S110) and acquiring the test pixel data from the test pixels P10' of the test image W1' (i.e., operation S120) may be performed simultaneously with S100 of measuring the thickness of the test wafer W1 and/or the test element layer formed on the test wafer W1, or they may be respectively performed independently of an order thereof.

Next, a data set required to train the thickness predicting model may be generated (S130). The data set may be used to train and verify the thickness predicting model. The data set may include a thickness T of the test pixel W1 and/or the test element layer, actually measured in the test positions P10, and RGB values of the test pixels P10' on the test image W1' corresponding to the test positions P10. The data set may be generated by matching the thickness T actually measured in each of the test positions P10 and the RGB values of each of the test pixels P10'.

Next, the generated data set may be used to generate a thickness predicting model (S140). The thickness predicting model may be a non-linear regression analysis model generated using at least one machine learning technique. The machine learning technique may use at least one algorithm among Random Forest, AdaBoost, Gradient Boosting, Polynomial Regression, or Gaussian Process Regression. The specific process of generating the thickness predicting model will be described later.

Figure 4:
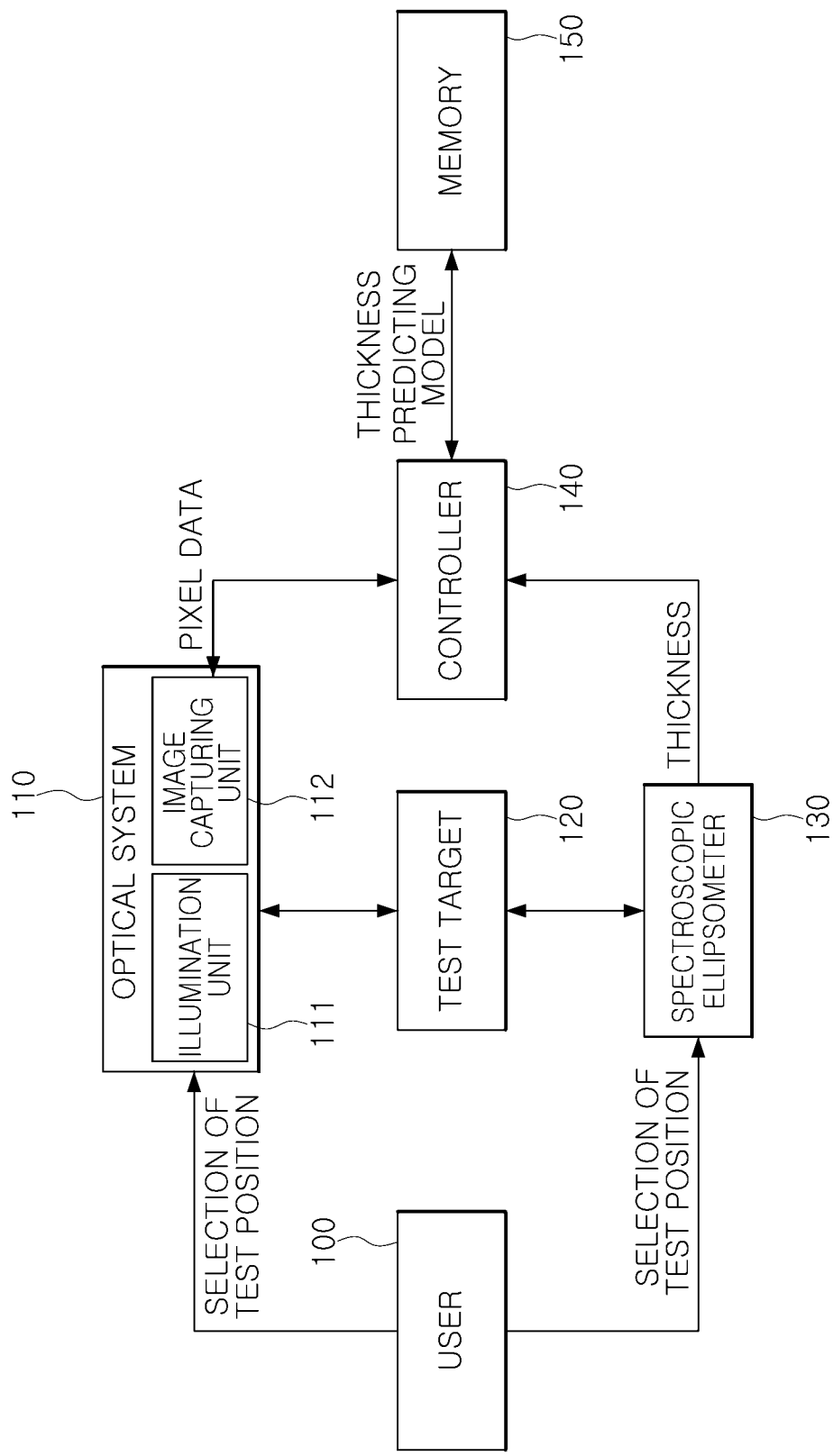
FIG. 4 is a block diagram illustrating configurations for generating a thickness predicting model in a thickness estimating apparatus according to an example embodiment.

FIG. 4 is a block diagram illustrating configurations for generating a thickness predicting model in a thickness estimating apparatus according to an example embodiment.

Referring to FIG. 4, a thickness estimating apparatus according to an example embodiment may include an optical system 110, a spectroscopic ellipsometer 130, a controller 140, and a memory 150. The optical system 110 may include an illuminating unit 111 for radiating light to a test target 120, and an image capturing unit 112 for capturing a test image using light reflected from the test target 120. According to an example embodiment, the illuminating unit 111 may be a light source and the image capturing unit 112 may be a camera.

In an example embodiment, a user 100 operating and managing the thickness estimating apparatus may optionally choose a test position for measuring a thickness of the test target 120, and test pixels in a position corresponding to a test position for acquiring pixel data from the test image. A thickness of the test target 120 may be measured using the spectroscopic ellipsometer 130, and pixel data of the test pixel may be acquired using the optical system 110. The pixel data may be RGB values of the test pixels.

The controller 140 may generate a thickness predicting model based on a machine learning technique using various algorithms. In order to generate the thickness predicting model, the controller 140 may acquire the pixel data of the test image from the optical system 110, and may acquire thickness data of the test target 120 from the spectroscopic ellipsometer 130. The pixel data and the thickness data may be included in a data set for generating the thickness predicting model.

In an embodiment, a test wafer may be used as the test target 120 for generating the thickness predicting model, and at least one test element layer formed by a semiconductor process may be disposed on the test wafer. As an example, the test wafer and the test element layer may respectively correspond to a wafer to be actually measured using the thickness predicting model, and an element layer formed on the wafer.

The thickness predicting model generated by the controller 140 may be stored in the memory 150. In order to estimate a thickness of at least one of the wafer and the element layer on the wafer while the semiconductor process is actually performed, the controller 140 may apply pixel data acquired from an image of the wafer to the thickness predicting model stored in the memory 150. According to embodiments, the controller 140 and the memory 150 may be provided separately from the semiconductor processing equipment.

Figure 5:
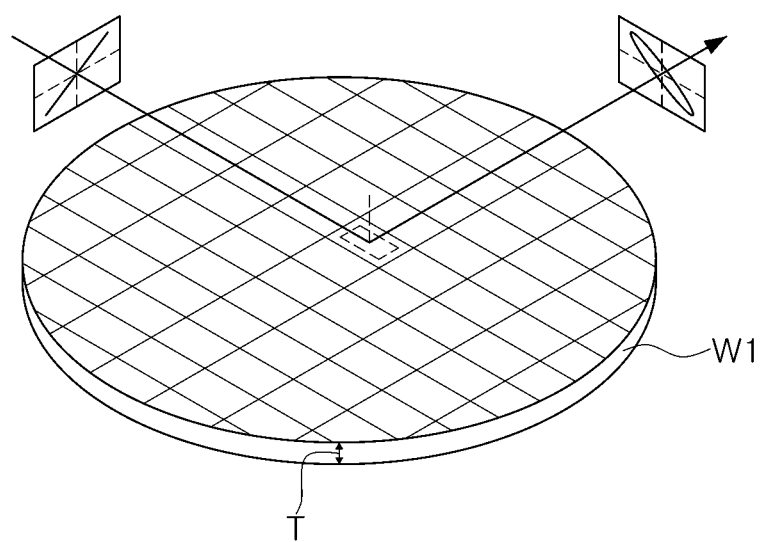
FIG. 5 is a view illustrating an operation of a spectroscopic ellipsometer for measuring a thickness of at least one of a test wafer and a test element layer formed on the test wafer in a thickness estimating apparatus according to an example embodiment.

FIG. 5 is a view illustrating an operation of a spectroscopic ellipsometer for measuring a thickness of at least one of a test wafer and a test element layer formed on the test wafer in a thickness estimating apparatus according to an example embodiment.

Referring to FIG. 5, in an example embodiment, a thickness T of a test element layer may be measured using a non-destructive optical measurement method that does not damage a test wafer W1. The test wafer may include one or more test element layers formed on the test wafer. The test element layers may include a semiconductor material, a conductive material, an insulating material, a photoresist, or the like.

According to an example embodiment, in order to measure the thickness T of the test element layer on the test wafer W1, light may be radiated onto the test wafer W1 and may be reflected from the test wafer W1. The spectroscopic ellipsometer may selectively extract light reflected in the test positions to measure the thickness T, among reflected light, and may acquire and analyze a spectrum of extracted light, to measure the thickness T of the test element layer in the test positions. For example, light radiated onto the test wafer W1 may pass through a linear polarizer before being radiated onto the test wafer, and light reflected from the test wafer W1 may be extracted through an analyzer.

A thickness estimating apparatus according to an example embodiment may acquire thickness T data in test positions of the test wafer W1, and may use the thickness T data as a data set for generating a thickness predicting model. In a thickness estimating apparatus according to an example embodiment, the thickness T of at least one of the test wafer W1 and the test element layer on the test wafer W1 is illustrated to be measured by a spectroscopic ellipsometer, is only illustrative, and is not necessarily limited to such a form. According to embodiments, the spectroscopic ellipsometer may be replaced with various other devices capable of measuring the thickness T of the test wafer W1 and the test element layer.

Figure 6:
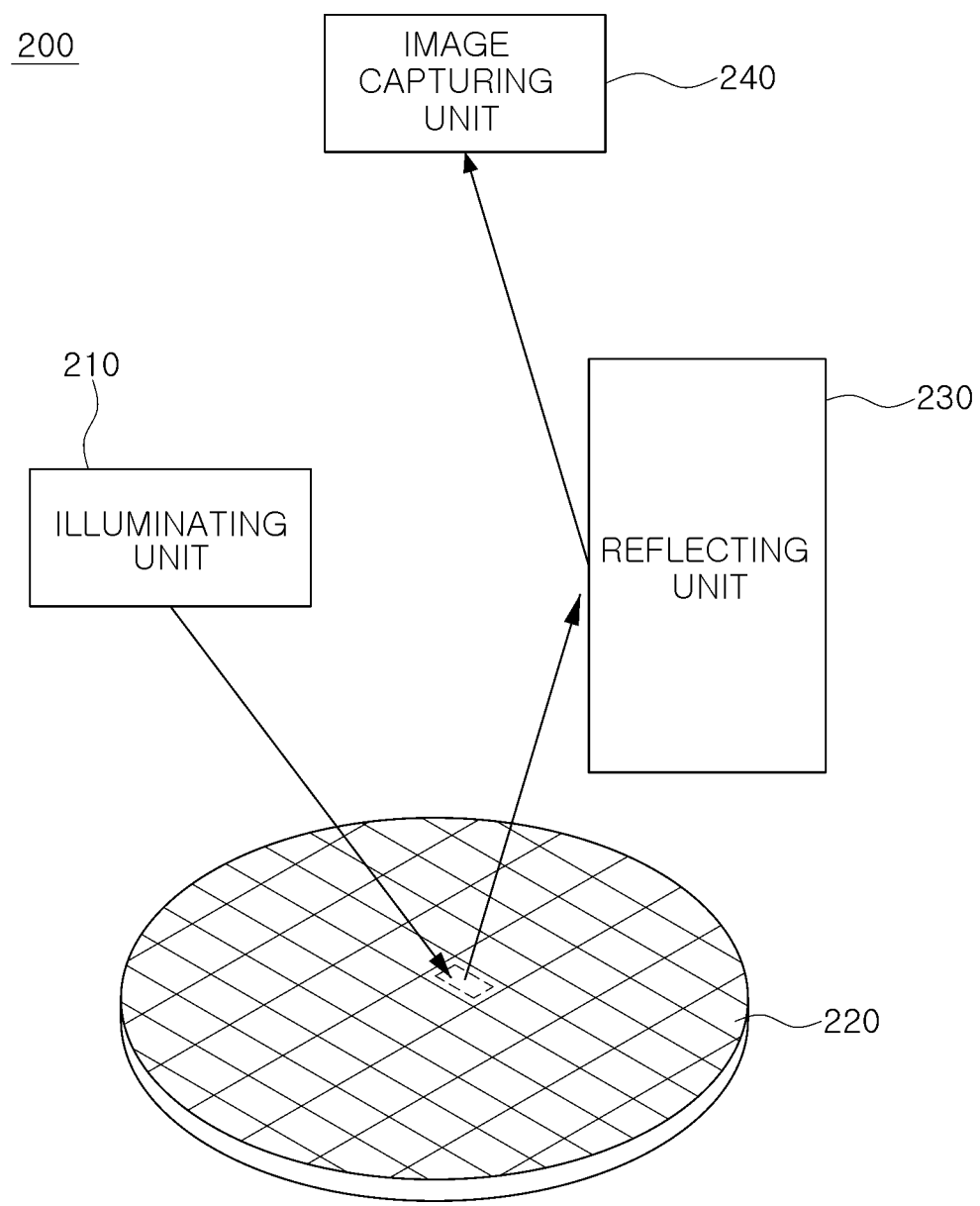
FIG. 6 is a view illustrating an operation of an optical system for obtaining an image of a wafer in a thickness estimating apparatus according to an example embodiment.

FIG. 6 is a view illustrating an operation of an optical system for acquiring an image of a wafer in a thickness estimating apparatus according to an example embodiment.

Referring to FIG. 6, an optical system 200 according to an example embodiment may include an illuminating unit 210 radiating light onto a capturing target 220, and an image capturing unit 240 using light reflected from the capturing target 220 to generate an image. For example, the illuminating unit 210 may include a white LED as a light source, and the image capturing unit 240 may include an image sensor that converts light reflected from the capturing target 220 into an electrical signal. In an embodiment, the image capturing unit 240 may be a line scan camera. According to embodiments, the optical system 200 may include a reflecting unit 230 reflecting light reflected from the capturing target 220 again and radiating the light onto the image capturing unit 240. The reflecting unit 230 may be a total reflection mirror. An optical system 200 according to an embodiment may be configured to correspond to the optical system 110 illustrated in FIG. 4.

The capturing target 220 may be a wafer and/or a test wafer. For example, at a time point before or after the semiconductor process is performed on the wafer, in order to estimate a thickness of the wafer and/or a thickness of the element layer formed on the wafer, the optical system 200 may capture an image of a wafer. The image acquired by the optical system 200 by capturing the wafer may be used to estimate a thickness of the wafer and/or a thickness of the element layer by a thickness estimating apparatus operating in conjunction with the optical system 200. For example, the thickness estimating apparatus may acquire pixel data of each of at least a portion of pixels selected from the image generated by the optical system 200. The thickness estimating apparatus may input the pixel data of each of the pixels into the thickness predicting model to calculate a thickness of the wafer and/or a thickness of the element layer in positions corresponding to each of the pixels.

In addition, when it is desired to generate a thickness predicting model, the capturing target of the optical system 200 may be a test wafer. For example, the test wafer may be the same as the wafer for estimating a thickness thereof using the thickness predicting model. The optical system 200 may capture the test wafer to generate a test image thereof, and the thickness predicting model may be generated based on a thickness actually measured on the test wafer, and pixel data acquired from the test image. In an embodiment, the pixel data may be acquired from pixels of a test image corresponding to positions of the test wafer actually measuring the thickness.

In an embodiment, the optical system 200 is illustrated to include the illuminating unit 210 and the imaging unit 240, and further include the reflecting unit 230, is only illustrative, and is not necessarily limited to such a form. For example, an original image of the wafer W may be directly captured using the image capturing unit 240, without the illuminating unit 210 and the reflecting unit 230. An optical system 200 according to an embodiment may be operated independently by being coupled to process equipment to capture an image of the wafer before and/or after the process, and may be operated independently of the process equipment without a complicated separate installation procedure.

The optical system 200 according to an embodiment illustrated in FIG. 6 may be disposed above a transfer path on which a wafer is transferred in semiconductor processing equipment. As an example, the illuminating unit 210 may be disposed above the transfer path, to radiate light onto the wafer transferred on the transfer path. The image capturing unit 240 may generate an original image using light reflected from the wafer.

As described above, the optical system 200 may be disposed above the transfer path to capture the wafer W, to improve efficiency of the process, as compared to a method of installing the optical system 200 in a separate space for capturing the wafer W. In this case, acceleration and/or deceleration may occur while capturing the wafer on the transfer path, and distortion may appear in the original image generated by the image capturing unit 240. Therefore, the image capturing unit 240 and/or a controller interlocked with the image capturing unit 240, or the like, may compensate for distortion of the original image. Hereinafter, a method of compensating for distortion of the original image will be described with reference to FIG. 7.

Figure 7:
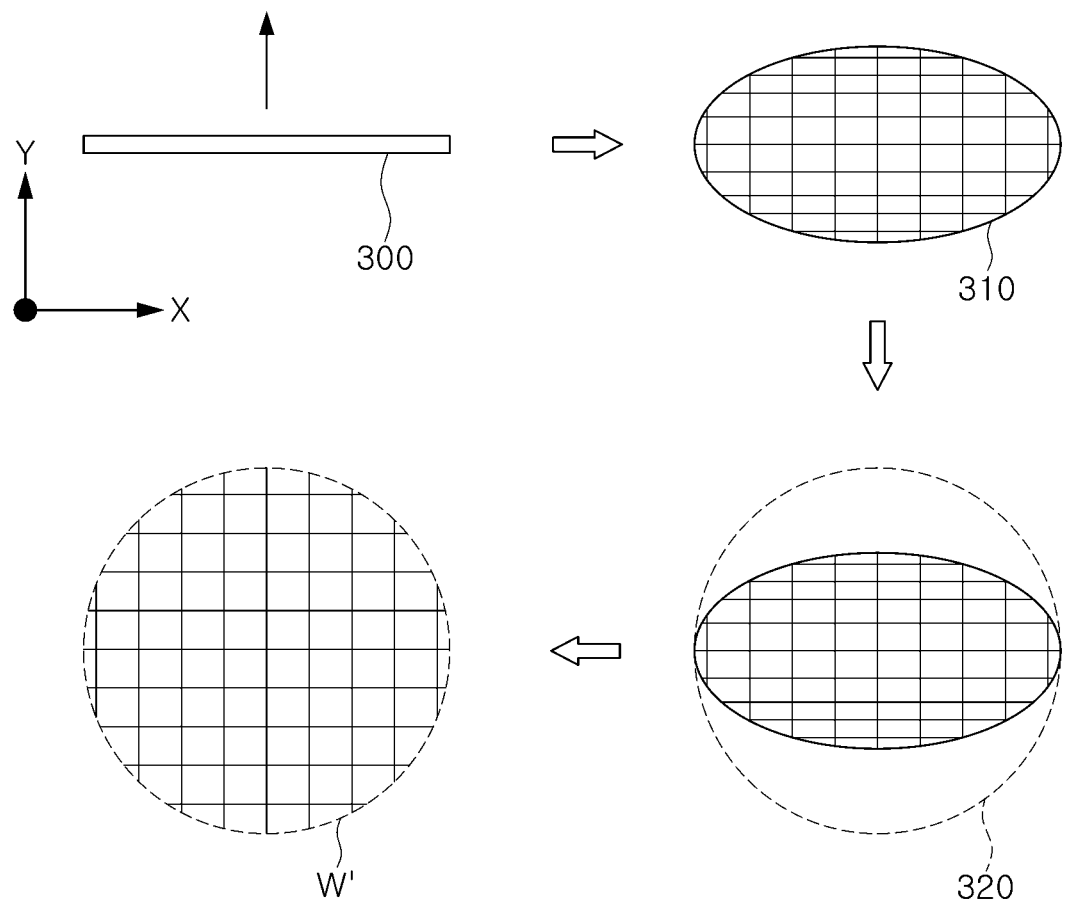
FIG. 7 is a view illustrating images of a wafer changing according to an original correction algorithm in a thickness estimating apparatus according to an example embodiment.

FIG. 7 is a view illustrating images of a wafer changing according to a circular correction algorithm in a thickness estimating apparatus according to an example embodiment.

Referring to FIG. 7, while a transfer robot transfers a wafer W along a transfer path between a transfer chamber and a process chamber, the wafer W may be inspected using an original image captured by an optical system. When the transfer path of the wafer W is not relatively long and time for the transfer robot to transfer the wafer W is not sufficient for the optical system to capture a process target, the original image acquired in a region in which a transfer speed increases/decreases may have distortion of the wafer W. Therefore, in order to perform an accurate inspection of the wafer W, an appropriate correction procedure capable of correcting the distortion may be performed.

An original image 300 of the wafer W captured using the optical system according to an example embodiment may have a linear form. In the embodiment illustrated in FIG. 7, the original image 300 is illustrated to have a linear form, is only illustrative, and is not necessarily limited to the linear form. The optical system may analyze the captured original image 300 in units of frames to extract and combine frames in which the wafer W is present, to generate a scanned image 310 of the wafer W. Due to a non-linear movement of a transfer robot or a stage and a vibration during transfer, the scanned image 310 may have a shape, different from an actual shape of the wafer W. For example, the scanned image 310 may have an elliptical shape with noise.

In the embodiment illustrated in FIG. 7, a direction in which the transfer robot transfers the wafer W may be a vertical direction (a y-axis direction). When capturing using the optical system is performed, a transfer speed of the wafer W may not be constant in a transfer direction, and may increase or decrease, and the embodiment illustrated in FIG. 7 may correspond to a case in which the transfer speed decreases. Therefore, the wafer W having a circular shape may be distorted to have a compressed shape in the transfer direction, and may represent as the scanned image 310 having an elliptical shape with a short axis.

When capturing using the optical system is in progress, and a transfer speed of the wafer W increases in the transfer direction, the wafer W may represent as the scanned image 310 having a shape, different from the embodiment illustrated in FIG. 7. As an example, the wafer W may represent as a scanned image having an elliptical shape with a long axis in the transfer direction. A shape of the wafer W represented as the scanned image 310 is not limited to an elliptical shape, and may be variously changed, depending on a transfer speed and a vibration generated during transfer.

In order to increase accuracy of an inspection performed using an image captured by an optical system, in an example embodiment, an image correction process may be applied, in units of pixels, to the scanned image 310 generated based on the original image 300, to correct distortion. The optical system according to an example embodiment may change coordinates of each pixels included in the scanned image 310 according to a predetermined algorithm, to generate a corrected image 320. For example, the coordinates of each of the pixels included in the scanned image 310 may be changed to be coordinates corresponding to a circular pixel, which may be an actual shape of the wafer W. As a result, the corrected image 320 may have a circular shape corresponding to the actual shape of the wafer W.

A circular correction algorithm described with reference to FIG. 7 may be an example that may be adopted by an optical system of a semiconductor process according to the inventive concept, and may adopt a method, other than the circular correction algorithm, or may adopt another method together with the circular correction algorithm to correct the original image 300.

A thickness estimating apparatus according to an example embodiment may acquire pixel data from each of the pixels of the corrected image 320, and may use the pixel data as data for generating a thickness predicting model. The corrected image 320 used to generate the thickness predicting model may be a test image W1' based on a test wafer W1. The pixel data may be RGB values of test pixels in positions corresponding to test positions on the test wafer W1.

Figure 8:
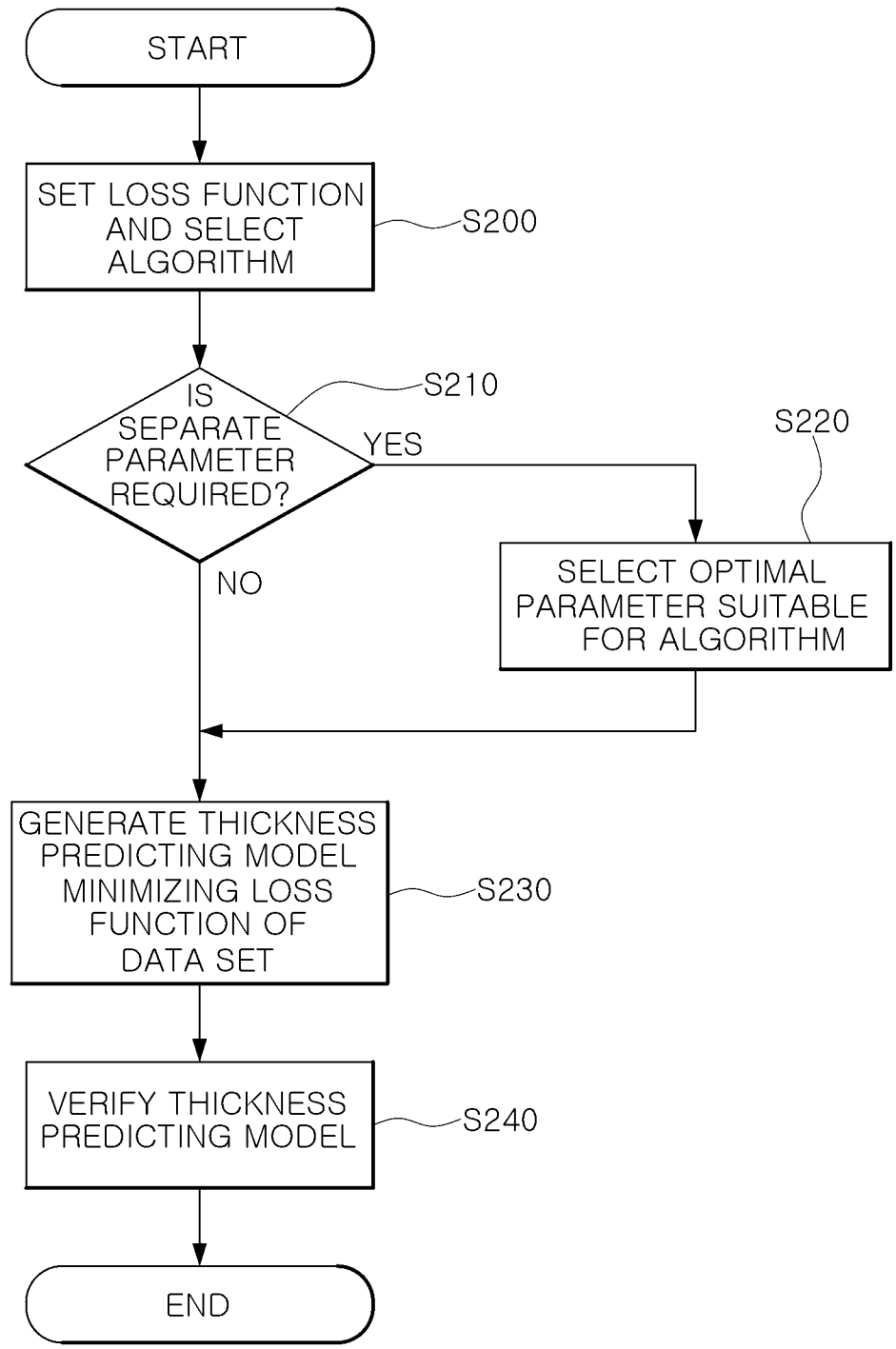
FIG. 8 is a flowchart illustrating a process of generating a thickness predicting model in a thickness estimating apparatus according to an example embodiment.

FIG. 8 is a flowchart illustrating a process of generating a thickness predicting model in a thickness estimating apparatus according to an example embodiment.

Hereinafter, for convenience of description, a method of generating a thickness predicting model will be described with reference to FIG. 4 together. Referring to FIGS. 4 and 8, the controller 140 may use acquired data set to generate a thickness predicting model, and may store the thickness predicting model in the memory 150. The data set may include test pixel data of test pixels acquired from a test image generated by the optical system 110 capturing the test wafer, and thickness data of the test wafer and/or thickness data of the test element layer formed on the test wafer, measured using the spectroscopic ellipsometer 130. In addition, the data set may include test positions for measuring a thickness by the spectroscopic ellipsometer 130, and information on test pixels corresponding to the test positions.

The controller 140 may generate the thickness predicting model using a machine learning technique based on various algorithms. For example, the algorithm may be at least one of Random Forest, AdaBoost, Gradient Boosting, Polynomial Regression, or Gaussian Process Regression. For each of the algorithms, characteristics such as a size and accuracy of a training data set required to generate the model may be different. For example, sizes of the training data set required to generate the model having satisfactory accuracy for each of the algorithms may be different.

In relation to the generation of the thickness predicting model in a thickness estimating apparatus according to an example embodiment, the controller 140 may set a loss function and may select an algorithm (S200). The loss function may refer to a difference between an output value of the model generated by a machine learning technique and an output value desired by a user. The loss function may basically be a Mean Square Error (MSE). A loss function set in an embodiment is only illustrative, and is not limited to the Mean Square Error (MSE), and a Cross Entropy Error (CEE) may be used as necessary.

According to an example embodiment, sizes of the training data sets (N1, N2, and N3, respectively) required when using the Random Forest algorithm, the Adaboost algorithm, and the Gradient Boosting algorithm to generate thickness predicting models, may be similar to each other. A size (N4) of the training data set required when using the Polynomial Regression algorithm may be relatively larger than that of the training data set required when using other algorithms, and a size (N5) of the training data set required when using the Gaussian Process Regression algorithm may be smaller than that of the training data set required when using other algorithms. For example, comparison results of the number of the training data required in each of the algorithms may be N4>N1≈N2≈N3>N5.

For example, the training data required in the Gaussian Process Regression algorithm may be on the order of hundreds of pieces of data, and as examples, 200 to 300 pieces of data may be required. The training data required in each of the Random Forest algorithm, the Adaboost algorithm, and the Gradient Boosting algorithm may be around 1,000, and the training data required in the Polynomial Regression algorithm may be around 2,000. Therefore, a user may select which algorithm for generating a thickness predicting model, depending on a size of the training data set acquired from the process target and process accuracy required by the process target.

Next, in operation S210, it may be determined whether a separate parameter is required for the algorithm selected in S200. When the separate parameter is required as a result of the determination in S210, an optimal parameter and an optimal value suitable for the algorithm may be selected (S220). For example, in the Random Forest algorithm, the Adaboost algorithm, and the Gradient Boosting algorithm, parameters for the number and depths of nodes may be required. In the case of the Polynomial Regression algorithm, a parameter for the order of a polynomial model may be required, and in the case of the Gaussian Process Regression algorithm, a hyper-parameter may be required. The optimal parameter for each of the algorithms may be different, depending on the process target and environment. Therefore, the optimal parameter for each of the algorithms may be optionally selected by the user.

When the initial setting for generating the thickness predicting model is completed, the controller 140 may generate the thickness predicting model minimizing the loss function of the data set (S230). The operation of minimizing the loss function in each of the algorithms may be different. The machine learning method using each of the algorithms may gradually minimize the loss function while continuing to learn based on the training data set.

The controller 140 may verify the thickness predicting model generated through the data set (S240), and the thickness predicting model may be continuously updated in the process. The user may select a thickness predicting model suitable for a process target by the verification of thickness predicting models generated using each of the algorithms, and may apply the thickness predicting model according to an example embodiment.

Figure 9:
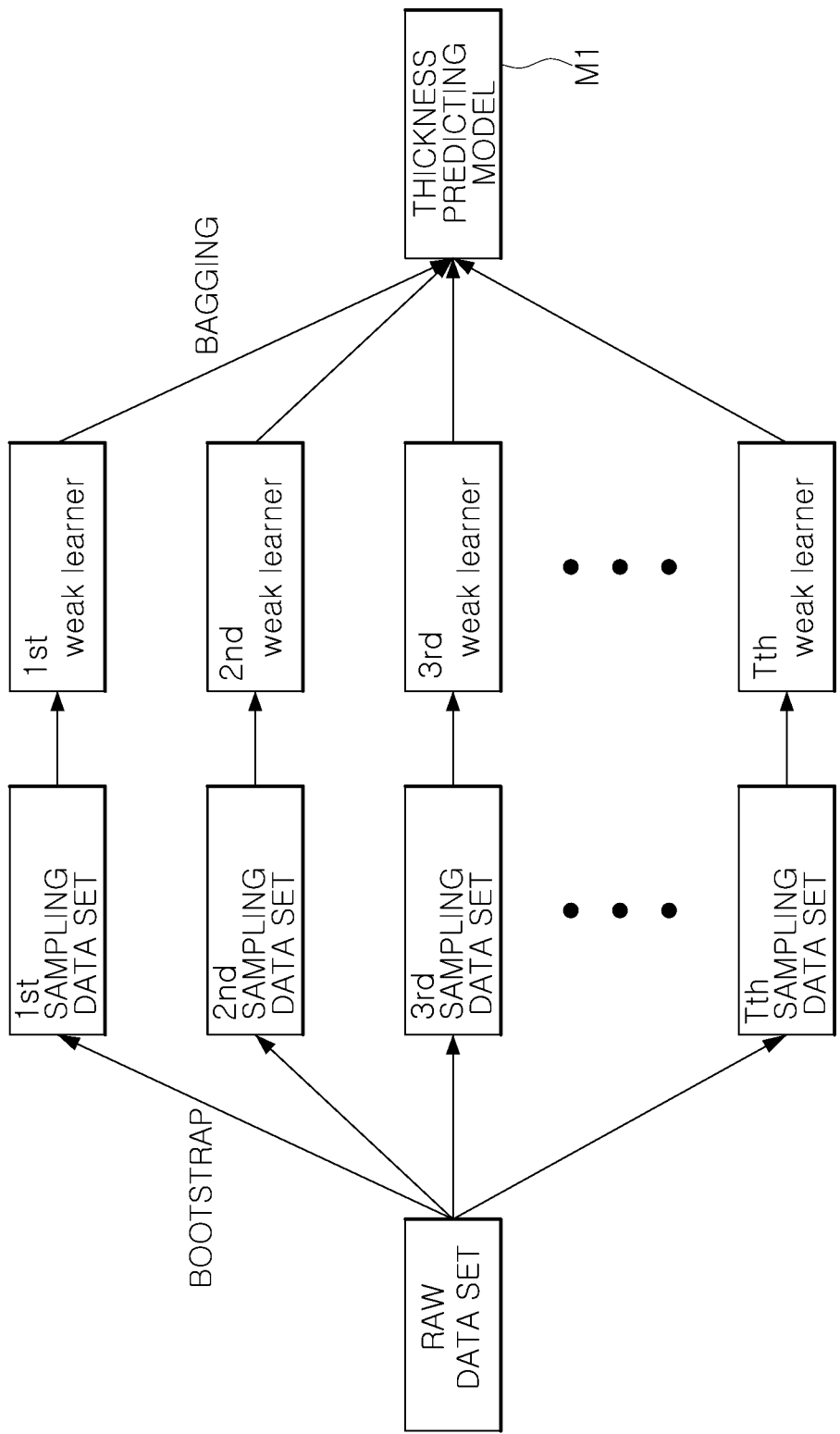
FIGS. 9 to 11 are views illustrating an algorithm used to generate a thickness predicting model in a thickness estimating apparatus according to an example embodiment.
Figure 10:
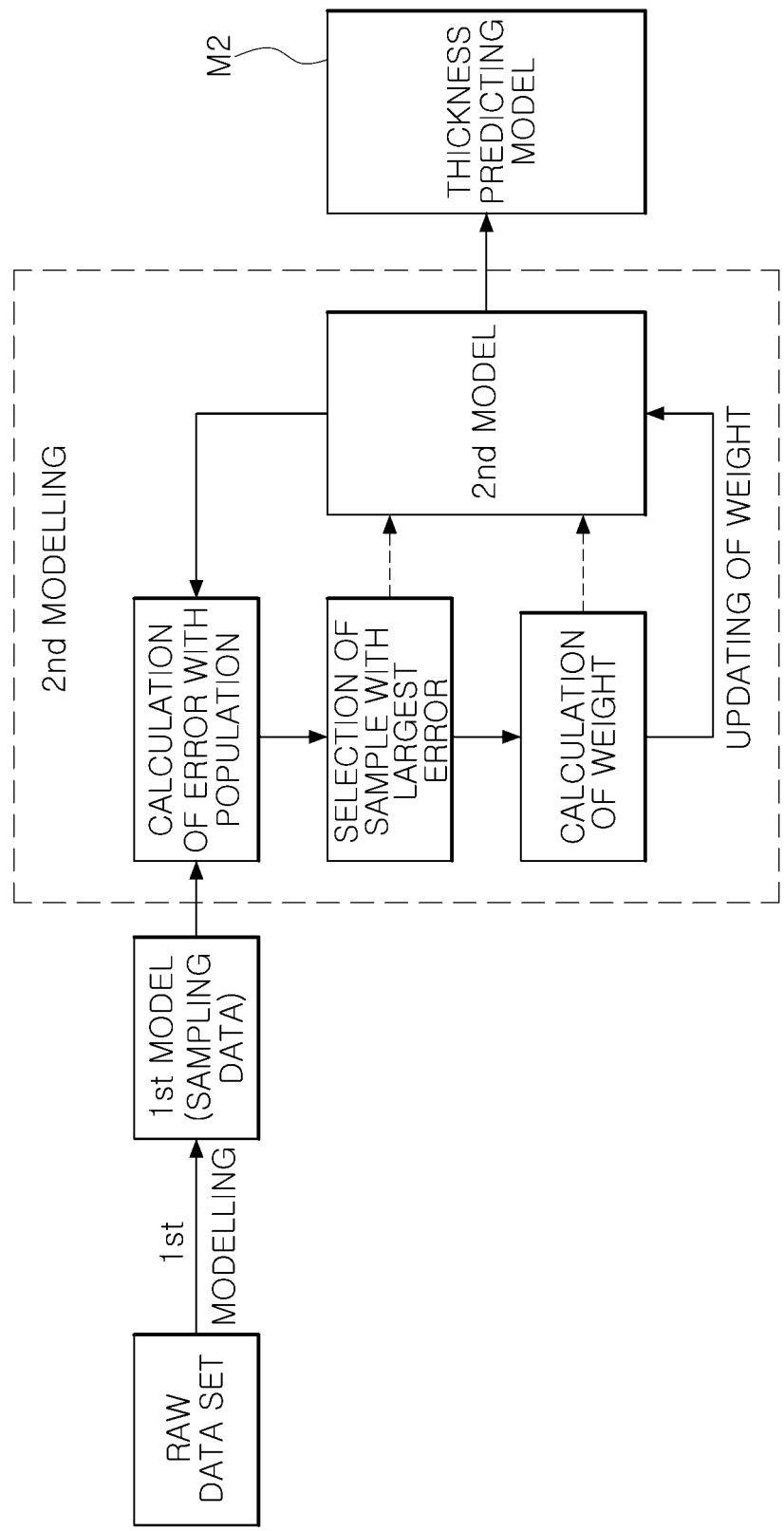
Figure 11:
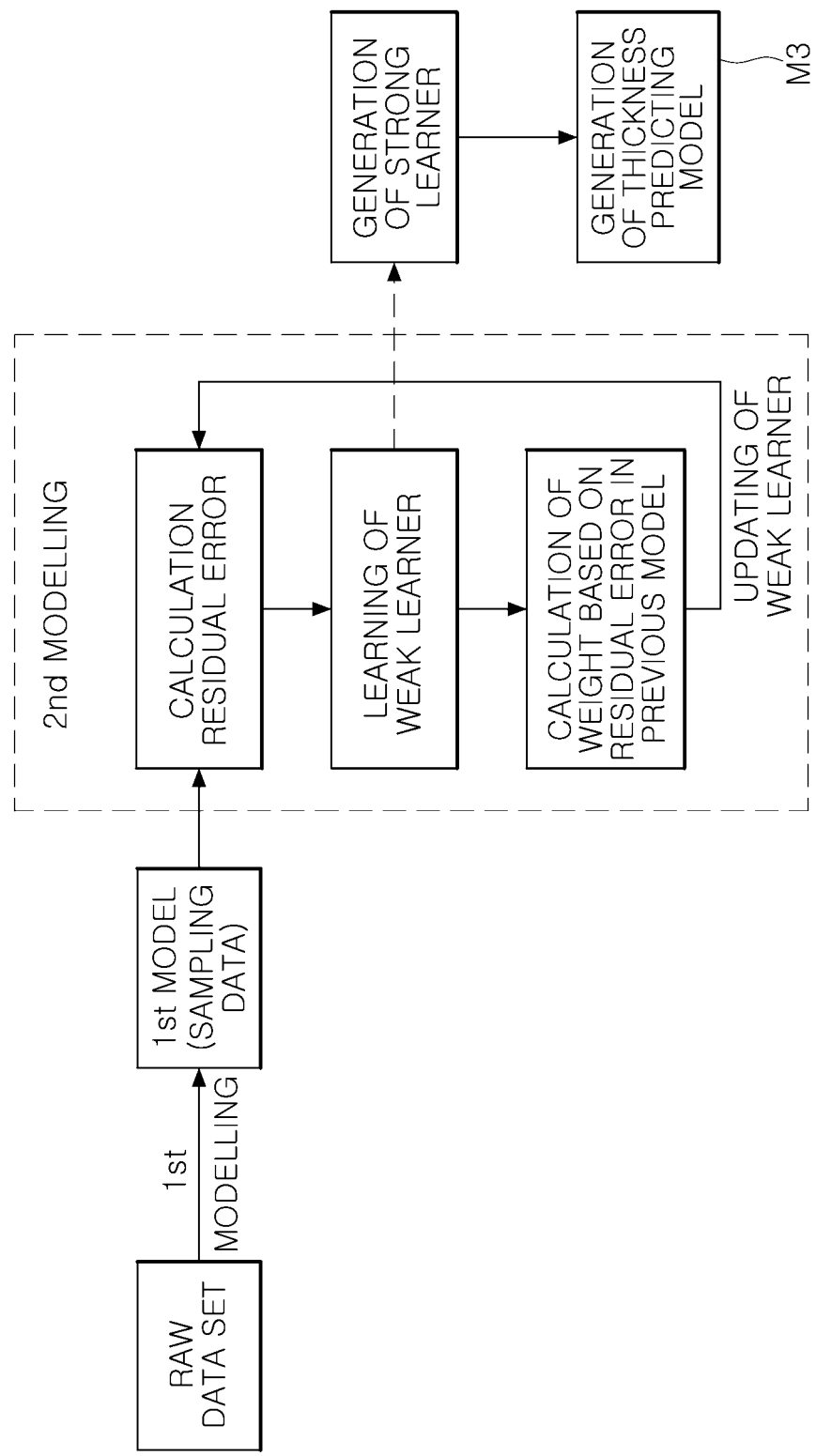

FIGS. 9 to 11 are views illustrating an algorithm used to generate a thickness predicting model in a thickness estimating apparatus according to an example embodiment.

Referring to FIG. 9, a thickness predicting model may be generated using a Random Forest algorithm. The Random Forest algorithm may include a bootstrap process allowing redundancy in given data to generate a data set of the same size as a data set, and a bagging process coupling each weak learners based on data generated by the bootstrap process.

In a thickness estimating apparatus according to an example embodiment, T sampling data sets having the same size as the data set may be generated using the bootstrap process based on the data set of FIG. 2. In addition, a learner constituting a forest may be trained and modeled, based on the T sampling data sets to be generated. The learner trained by the bootstrap process may reduce variance and maintain bias and at the same time to improve performance of the learner. Finally, each of the trained and modeled learners may be bagged into a random forest. A thickness predicting model M1 may be generated based on the bagged random forest.

Referring to FIGS. 10 and 11, a thickness predicting model may also be generated using an Adaboost algorithm or a Gradient Boosting algorithm, which may be a kind of a boosting technique. When using the Adaboost algorithm, a thickness predicting model with good performance while compensating for a model previously learned for a single model may be generated.

Referring to FIG. 10, when a thickness predicting model is generated using the Adaboost algorithm, a weight of underfitted sampling data may increase, and a newly trained model may be made to be more suitable for data, difficult to learn.

In a thickness estimating apparatus according to an example embodiment, a $1^{st}$ model composed of sampling data may be generated using the data set of FIG. 2. Considering each of the pieces of sampling data, an error with a population may be calculated, and a weight for the pieces of sampling data with the smallest error may be calculated to be relatively high. The weight may be initially set equally for each of the pieces of sampling data. The calculated weight may be reflected to be updated as a $2^{nd}$ model. The updating operation may be repeated based on the pieces of sampling data to generate a thickness predicting model M2.

Referring to FIG. 11, when a thickness predicting model is generated using the Gradient Boosting algorithm, a new model may be trained using a residual error in the previously learned model, rather than updating the weight of the pieces of sampling data.

In a thickness estimating apparatus according to an example embodiment, a $1^{st}$ model composed of sampling data may be generated using the data set of FIG. 2. A residual error between each of the pieces of sampling data and a sample population may be calculated, and the residual error may be used to train a learner. A weight may be calculated based on a residual error in the previous model, and the calculated weight may be reflected and a strong learner may be used, to generate a thickness predicting model M3.

The thickness predicting model may be generated using the Polynomial Regression algorithm or the Gaussian Process Regression algorithm. When the Polynomial Regression algorithm is used, a regression model may be expressed by assuming the model to form an $n^{th}$ order polynomial for 1-dimensional data. When the Gaussian Process Regression algorithm is used, a regression model may be expressed by assuming that the data follow a Gaussian distribution. In each of the algorithms, a set of outputs may be expressed as a matrix form for a regression model expressed by the assumptions, and then coefficient vectors required for model construction may be calculated by calculation of an inverse matrix.

Figure 12:
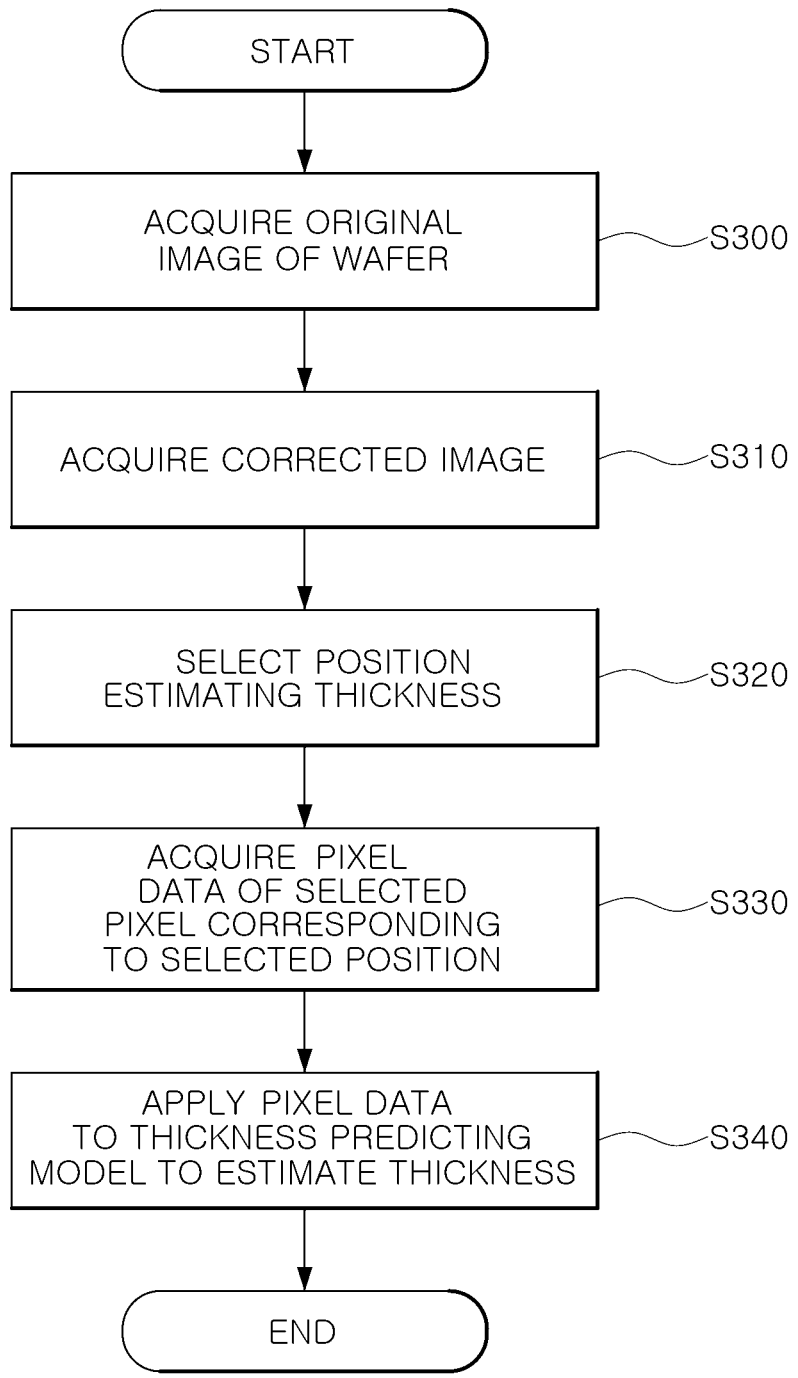
FIG. 12 is a flowchart illustrating a process of estimating a thickness of at least one of a wafer and an element layer based on a generated thickness predicting model in a thickness estimating apparatus according to an example embodiment.

FIG. 12 is a flowchart illustrating a process of estimating a thickness of at least one of a wafer and an element layer based on a generated thickness predicting model in a thickness estimating apparatus according to an example embodiment.

Referring to FIG. 12, a thickness estimating apparatus according to an example embodiment may capture an image of a wafer for estimating a thickness of at least one of the wafer and an element layer formed on the wafer, and apply data acquired from the image to a thickness predicting model to be generated to estimate the thickness of the element layer over the entire area without physical measurement time. According to an example embodiment, the data acquired from the image may be directly applied to a thickness predicting model without a separate data processing process.

In order to estimate the thickness of at least one of the wafer and the element layer based on the thickness predicting model, an original image may be acquired by capturing the wafer to estimate the thickness of at least one of the wafer and the element layer (S300). S300 may be performed using the optical system 50 illustrated in FIG. 1. With respect to the acquired original image of the wafer, a corrected image having the same shape as the wafer may be acquired (S310). In S310, an original image 300 may be synthesized using the circular correction algorithm illustrated in FIG. 7, to generate a scanned image 310, and distortion of the scanned image 310 may be corrected to be converted into a corrected image 320, which may correspond to an actual wafer W. According to another embodiment, an operation S310 of processing the original image may be omitted.

With respect to the wafer, at least one position for estimating a thickness of at least one of the wafer and the element layer may be selected (S320). The at least one position may be included in a test position previously selected by the user 100 as illustrated in FIG. 4.

According to an embodiment, pixel data of at least one selected pixel may be acquired from the corrected image (S330). The selected pixel may be a pixel in a position corresponding to the selected position of the semiconductor wafer, and the selected pixel data may be an RGB value. As a result, the acquired pixel data may be applied to the thickness predicting model generated according to the flowchart illustrated in FIG. 2, to estimate a thickness of at least one of the wafer and the element layer formed on the wafer (S340).

Figure 13:
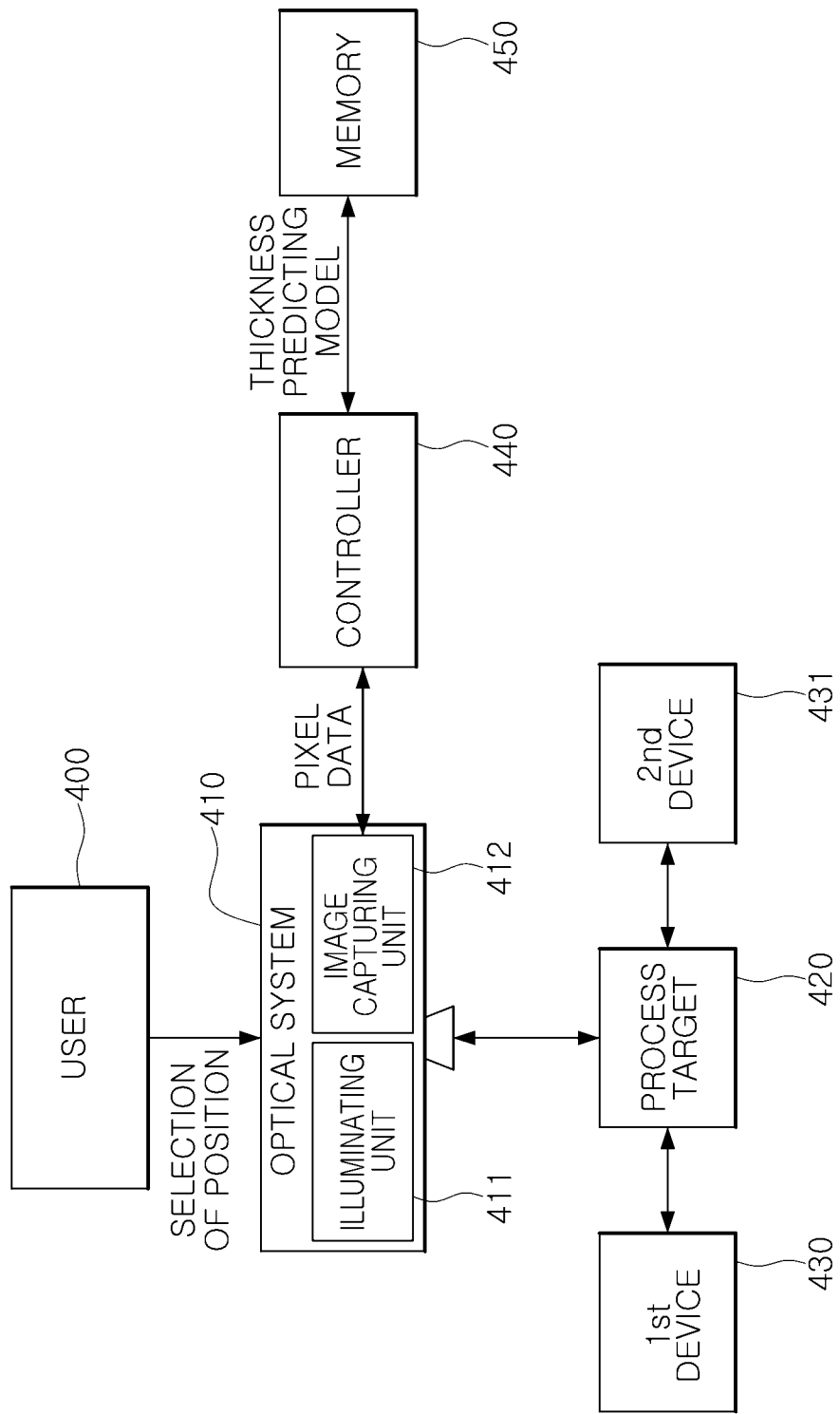
FIG. 13 is a block diagram illustrating configurations for estimating a thickness of at least one of a wafer and an element layer based on a generated thickness predicting model in a thickness estimating apparatus according to an example embodiment.

FIG. 13 is a block diagram illustrating configurations for estimating a thickness of at least one of a wafer and an element layer based on a generated thickness predicting model in a thickness estimating apparatus according to an example embodiment.

Referring to FIGS. 12 and 13 together, a thickness estimating apparatus according to an example embodiment may include an optical system 410, a controller 440, and a memory 450. The optical system 410 may include an illuminating unit 411 and an image capturing unit 412, and may be used to capture an image of a process target 420. The optical system 410 may be the same device as the optical system 110 illustrated in FIG. 4. A configuration of the optical system 410 is not limited to the embodiment, and may be a device, separate from the optical system 110 used to capture an image of the test target 120. The image captured using the optical system 410 may be converted into a corrected image having a shape corresponding to the process target 420 by a circular correction algorithm.

The memory 450 may store a thickness predicting model generated according to the flowchart illustrated in FIG. 2. The controller 440 may apply selected pixel data of the corrected image acquired using the optical system 410 to the thickness predicting model stored in the memory 450, to predict a thickness of the process target 420 in a selected position corresponding to a position of a selected pixel. The controller 440 and the memory 450 may be provided separately from process equipment.

The process target 420 according to an example embodiment may be a wafer W and/or an element layer formed on the wafer. The wafer W may be transferred between the first device 430 and the second device 431, and a selection position of the wafer W for estimating a thickness may be optionally determined by a user 400. The controller 440 may acquire the selected pixel data of the selected pixel in a position corresponding to the selected position in the corrected image of the wafer W from the optical system 410, and the acquired selected pixel data may be applied to the thickness predicting model stored in the memory 450, to estimate a thickness of at least one of the wafer W and the element layer formed on the wafer W.

FIGS. 14A to 14D are views illustrating a method in which a thickness estimating apparatus according to an example embodiment is used in a CMP process.

A thickness estimating apparatus according to an example embodiment may be used to determine whether a semiconductor process has been normally performed. In an embodiment illustrated in FIGS. 14A to 14D, a thickness estimating apparatus according to an example embodiment may be applied to a CMP process performed to produce an image sensor. A thickness estimating apparatus according to an example embodiment may be applied to a production process of various semiconductor devices, other than the image sensor, and may be applied to other semiconductor processes in addition to the CMP process.

Figure 14A:
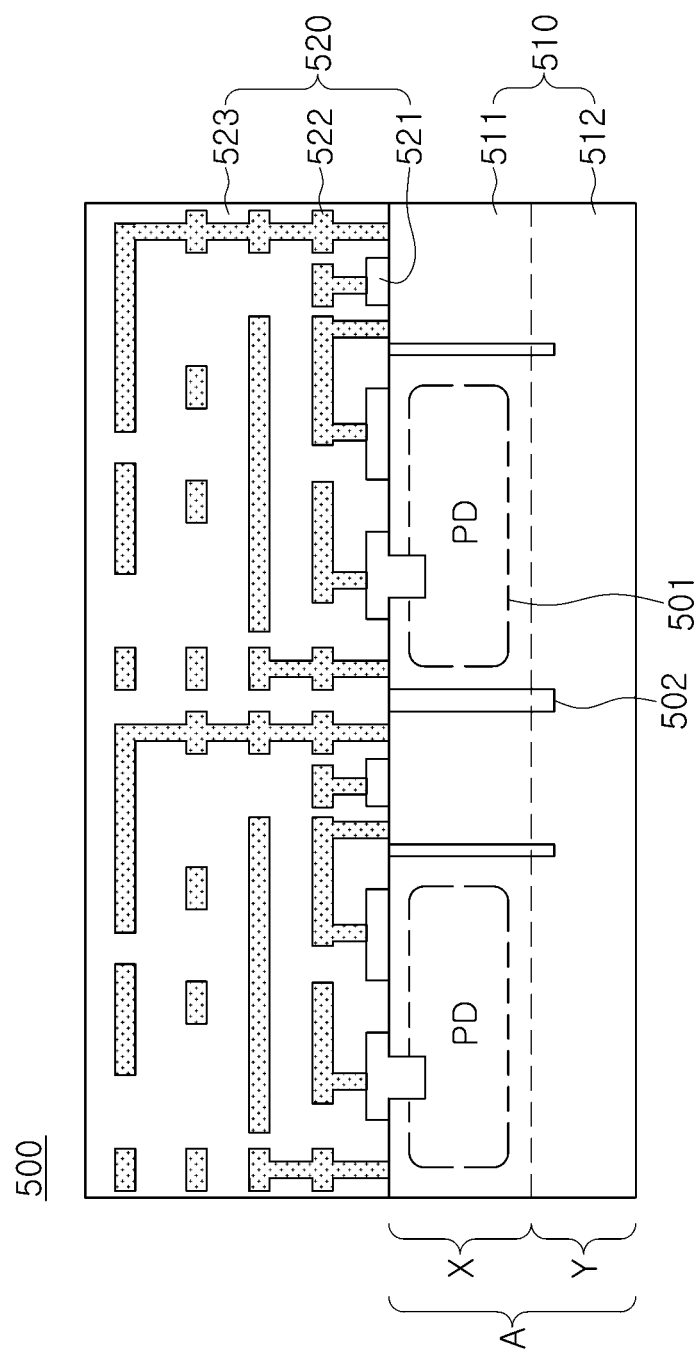
FIGS. 14A to 14D are views illustrating a method in which a thickness estimating apparatus according to an example embodiment is used in a chemical-mechanical polishing (CMP) process.

Referring to FIG. 14A, in an embodiment, an image sensor 500 may include a substrate 510 and an element layer 520. The substrate 510 may be a wafer including a semiconductor material, and may include a photodiode 501 and a vertical separator 502 separating the photodiodes 501. In the embodiment illustrated in FIG. 14A, the vertical separator 502 may be illustrated to be formed deeper than the photodiode 501, is only illustrative, and is not necessarily limited to such a form. The element layer 520 may be formed on one surface of the substrate 510. The element layer 520 may include transistors 521 and metal wirings 522, connected to the photodiode 501 to provide a pixel circuit. The transistors 521 and the metal wirings 522 may be covered by an insulating layer 523.

In an embodiment, the substrate 510 may include a first region 511 and a second region 512, and the second region 512 may be a region to be removed by a CMP process. A thickness X of the first region 511 and a thickness Y of the second region 512 may be variously changed according to embodiments.

A thickness estimating apparatus according to an example embodiment may capture an image of the substrate unit 510 for estimating a thickness, and may acquire an RGB value of a pixel from the captured image. An RGB value of a pixel acquired from an image of the substrate unit 510, when the process is not normally performed, may be different from an RGB value of a pixel acquired from an image of the substrate unit 510, when the process is normally performed.

Furthermore, a thickness estimating apparatus according to an example embodiment may apply a CMP process to the substrate 510 and may then apply an RGB value to a thickness predicting model, to estimate a thickness of the substrate unit 510. In this case, a thickness of the substrate 510 calculated by the thickness estimating apparatus may be compared with the thickness X of the first region 511, to determine whether the CMP process has been properly performed. Alternatively, a total thickness A of the substrate 510 before the CMP process may be first calculated, and the total thickness A and a thickness of the substrate 510 after the CMP process may be calculated, to compare a difference in thickness before and after the process with the thickness Y of the second region 512 to be removed by the CMP process. A thickness of the substrate 510 when the process is not normally performed may be different from a thickness of the substrate unit 510 when the process is normally performed.

Since the above methods for determining the process results are only illustrative, as all methods capable of determining whether the processes and products are normal, a thickness estimating apparatus according to the example embodiment may be applied for the products produced by the process, in addition to the above methods.

Figure 14B:
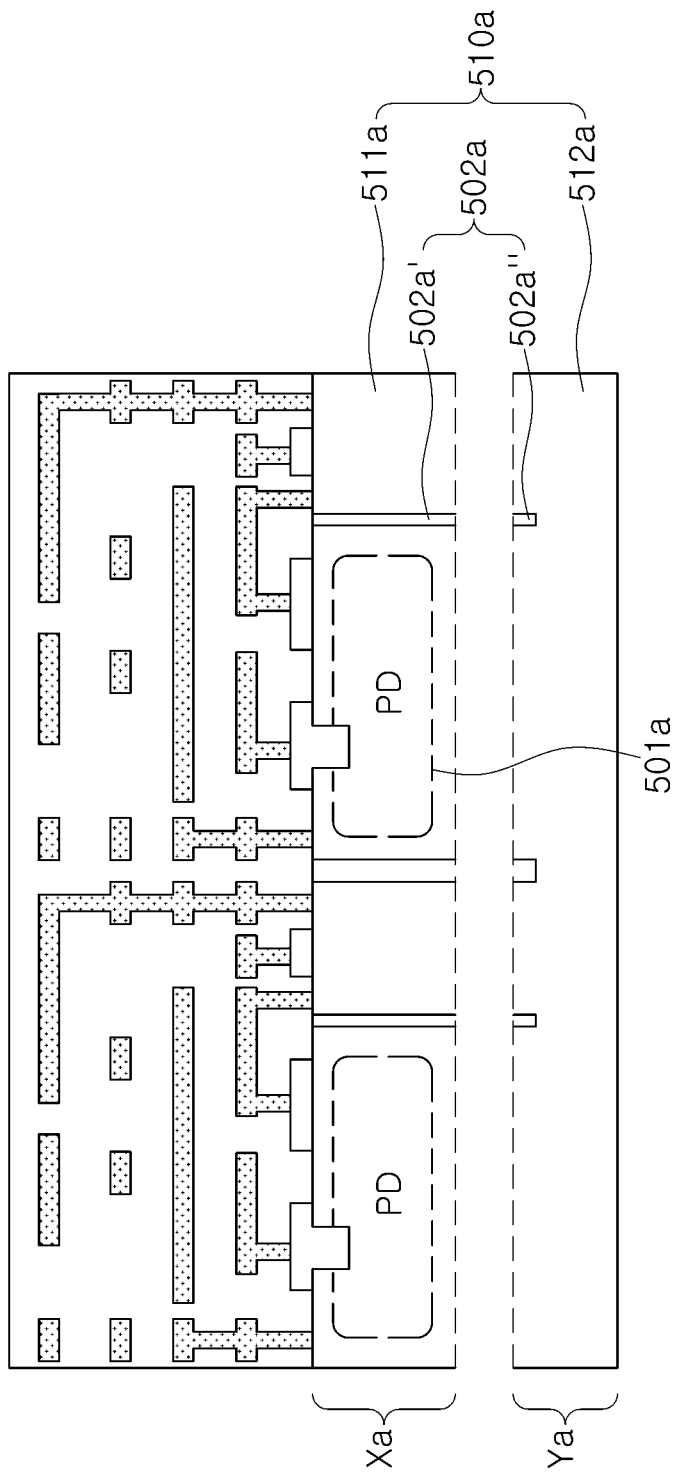
Figure 14C:
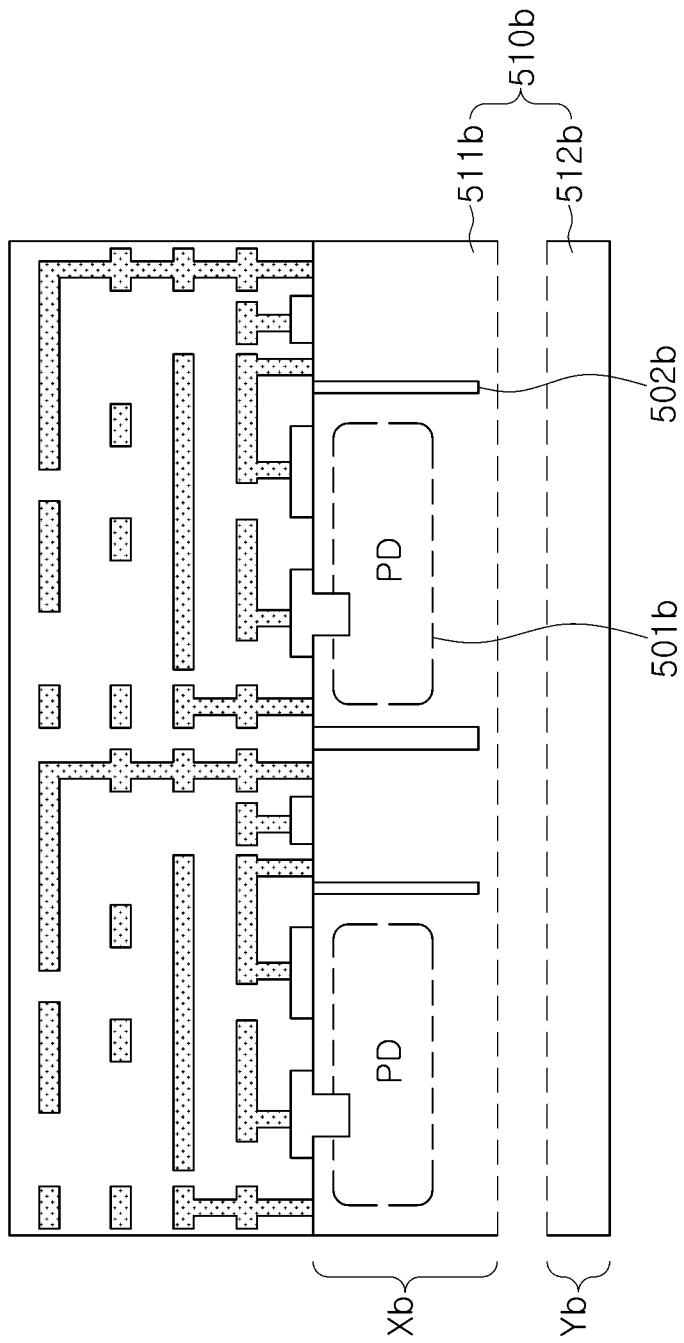
Figure 14D:
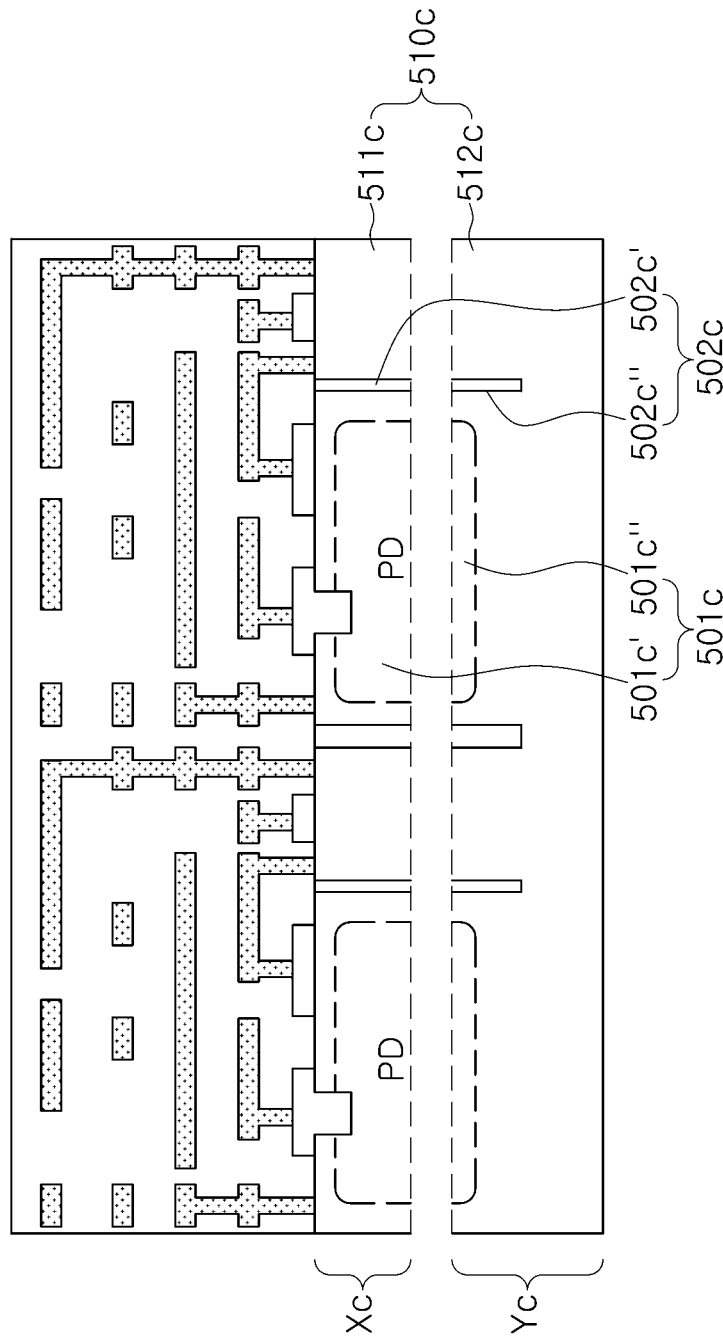

Referring to FIGS. 14B to 14D, a thickness estimating apparatus according to an example embodiment may estimate thicknesses of substrates 510a, 510b, and 510c and/or thicknesses of first and second regions of an image sensor 500. As a CMP process is applied to the image sensor 500, second regions 512a, 512b, and 512c of the substrates 510a, 510b, and 510c may be removed. The thickness estimating apparatus may estimate thicknesses of the first regions 511a, 511b, and 511c of a semiconductor substrate remaining after the CMP process, to determine whether the CMP process is normally performed. Alternatively, as described above, a difference in thickness between the substrate 510 before and after the CMP process may be calculated, and the difference in thickness may be compared with the thicknesses of the second regions 512a, 512b, and 512c to be removed by the CMP process, to determine results of the CMP process.

An embodiment illustrated in FIG. 14B may be an embodiment in which the CMP process is normally performed.

An RGB value of a pixel acquired using a thickness estimating apparatus according to an example embodiment may be similar to an RGB value when the process is normally performed. Therefore, a thickness Xa of a first region 511a estimated by applying the acquired RGB value to the thickness predicting model may be similar to the thickness X of the remaining first region 511 when the process is normally performed. Alternatively, a thickness Ya of a second region 512a removed by the CMP process may be calculated by subtracting the thickness Xa of the first region 511a estimated after the process from a total thickness (A) of a substrate 510a measured before the process. In this case, the thickness Ya of the estimated second region 512a may be similar to the thickness Y of the second region 512 removed when the process is normally performed. For example, based on the thicknesses of the first region 511a and the second region 512a calculated using the thickness predicting model, it may be determined that the CMP process has been properly performed.

Embodiments illustrated in FIGS. 14C and 14D may be an embodiment in which the CMP process is not normally performed. An RGB value of a pixel acquired using a thickness estimating apparatus according to an example embodiment may be different from an RGB value when the process is normally performed. Therefore, a thickness Xb or Xc of a first region 511b or 511c estimated by applying the acquired RGB value to the thickness predicting model may be different from the thickness X of the first region 511 remaining when the process is normally performed. Alternatively, a thickness Yb or Yc of a second region 512b or 512c removed by the CMP process may be calculated by subtracting the thickness Xb or Xc of the first region 511b or 511c estimated after the process from a total thickness A of a substrate 510b or 510c measured before the process. In this case, the estimated thickness Yb or Yc of the second region 512b or 512c may also be different from the thickness Y of the removed second region 512 when the process is normally performed.

For example, referring to FIG. 14C, when the CMP process is performed less than the normal process, the thickness Xb of the first region 511b may be greater than the thickness X of the first region 511 remaining when the process is normally performed. Alternatively, the thickness Yb of the second region 512b calculated by subtracting the thickness Xb of the first region 511b from the total thickness A of the substrate 510b before the process may be smaller than the thickness Y of the removed second region 512 when the process is normally performed. For example, in the embodiment illustrated in FIG. 14C, it may be determined that the CMP process for the substrate 510b has not been properly performed. In the embodiment illustrated in FIG. 14C, and an operation, such as increasing working time of the CMP process, may be performed.

Referring to FIG. 14D as an example, when the CMP process may be more performed than in the normal process, the thickness Xc of the first region 511c may be smaller than the thickness X of the remaining first region 511 when the process is normally performed. Alternatively, the thickness Yc of the second region 512c calculated by subtracting the thickness Xc of the first region 511c from the total thickness A of the substrate 510c before the process may be greater than the thickness Y of the removed second region 512 when the process is normally performed. For example, in the embodiment illustrated in FIG. 14D, it may be determined that the CMP process for the substrate 510c has not been properly performed, and an operation, such as increasing working time of the CMP process, may be performed.

A thickness estimating apparatus according to an example embodiment may generate a thickness predicting model based on a machine learning technique of non-linear regression analysis using various algorithms, may capture an image of a wafer in a wafer transfer path of a process chamber performing a semiconductor process, and may apply data acquired from the image to the thickness predicting model, to quickly inspect whether the process has been normally performed on the wafer. Therefore, since the image of the wafer may be used, without a separate space for inspection after the process, to complete the inspection for a minimum time, productivity may increase and costs may reduce.

At least one of the components, elements, modules or units (collectively "components" in this paragraph) represented by a block in any of the drawings may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Various and beneficial advantages and effects of the inventive concept may not be limited to the above, and will be more easily understood in the course of describing the specific example embodiments.

While example embodiments have been illustrated and described above, it will be apparent to those skilled in the art that modifications and variations could be made without departing from the scope of the inventive concept as defined by the appended claims.

What is claimed is:

1. A thickness estimating apparatus comprising:
    a transfer robot configured to transfer a wafer between a first device and a second device along a transfer path;
    a light source configured to emit light onto the wafer while on the transfer path;
    a camera configured to acquire an original image of the wafer based on the light reflected from the wafer;
    a memory configured to store a thickness predicting model, the thickness predicting model being generated based on a data set including a thickness of at least one of a test wafer corresponding to the wafer and a test element layer formed on the test wafer, and the thickness predicting model being trained using machine learning to minimize a loss function of the data set; and
    a controller configured to apply pixel data, which is acquired from at least one selected pixel selected from a plurality of pixels included in a corrected image generated based on the original image, to the thickness predicting model, to predict a thickness of at least one of the wafer or an element layer formed on the wafer in a position corresponding to a position of the selected pixel.

2. The thickness estimating apparatus according to claim 1, wherein the thickness predicting model is verified using the data set.

3. The thickness estimating apparatus according to claim 1, wherein the original image has a linear form.

4. The thickness estimating apparatus according to claim 3, wherein the corrected image is an image reconstructed from the original image based on a circular correction algorithm for an entire area of the wafer.

5. The thickness estimating apparatus according to claim 1, wherein the pixel data is an RGB value of the selected pixel in the corrected image.

6. The thickness estimating apparatus according to claim 1, wherein the data set comprises test pixel data of a test pixel, corresponding to the selected pixel, in a test image in which the test wafer is captured, and an actual thickness of at least one of the test wafer or the test element layer acquired in a test position on the test wafer, corresponding to the position of the selected pixel.

7. The thickness estimating apparatus according to claim 1, wherein the first device is a semiconductor process chamber, and the second device is a transfer chamber transferring the wafer.

8. The thickness estimating apparatus according to claim 7, wherein the semiconductor process chamber is a chemical/mechanical polishing (CMP) process equipment.

9. The thickness estimating apparatus according to claim 1, wherein the transfer robot comprises a chuck securing the wafer, and a linear stage transferring the wafer.

10. The thickness estimating apparatus according to claim 1, wherein the loss function is a Mean Square Error (MSE).

11. A thickness estimating apparatus according to claim 1, wherein the position on the wafer, corresponding to the position of the selected pixel, is optionally selected.

12. A thickness estimating apparatus comprising:
    a transfer robot configured to transfer at least one test wafer between a first device and a second device along a transfer path;
    a light source configured to emit light onto the test wafer on the transfer path;
    a camera configured to acquire a test image of the test wafer based on the light reflected from the test wafer;
    a controller configured to generate a thickness predicting model using machine learning, based on a data set including an actual thickness of at least one of the test wafer or a test element layer formed on the test wafer, respectively acquired in a plurality of test positions on the test wafer, and test pixel data of each of test pixels in positions corresponding to the plurality of test positions in the test image of the test wafer; and
    a memory configured to store the thickness predicting model,
    wherein the controller generates the thickness predicting model, to minimize a loss function of the data set by training the thickness predicting model using the machine learning.

13. The thickness estimating apparatus according to claim 12, further comprising a spectroscopic ellipsometer configured to measure the actual thickness of the test element layer.

14. The thickness estimating apparatus according to claim 12, wherein the thickness predicting model is generated by using at least one of Random Forest, AdaBoost, Gradient Boosting, Polynomial Regression, or Gaussian Process Regression as an algorithm of the machine learning.

15. The thickness estimating apparatus according to claim 14, wherein the algorithm of the machine learning, used to generate the thickness predicting model, is selected depending on characteristics of the test wafer.

16. The thickness estimating apparatus according to claim 12, wherein the controller uses an algorithm of the machine learning to update the thickness predicting model.

17. A thickness estimation method comprising:
    measuring a thickness of at least one of a test wafer or a test element layer formed on the test wafer in each of a plurality of test positions on the test wafer;
    acquiring test pixel data of each test pixel in positions corresponding to the plurality of test positions in a test image of the test wafer;
    generating a data set including the test pixel data, and a thickness of at least one of the test wafer or the test element layer measured in the plurality of test positions;

generating a thickness predicting model based on the data set, and using machine learning to train the thickness predicting model, to minimize a loss function of the data set;

storing the thickness predicting model in a memory;

acquiring an original image of a wafer captured by a camera;

acquiring a corrected image of the wafer based on the original image;

acquiring pixel data of at least one selected pixel selected in a position corresponding to at least one selected position of the wafer, from the corrected image; and predicting, by a processor, by applying the pixel data to the thickness predicting model stored in the memory, a thickness of at least one of the wafer or an element layer formed on the wafer in the at least one selected position.

18. The thickness estimation method according to claim 17, wherein the plurality of test positions of the test wafer comprises the at least one selected position of the wafer.

19. The thickness estimation method according to claim 17, wherein the measuring the thickness of the at least one of the test wafer or the test element layer formed on the test wafer in each of the plurality of test positions on the test wafer, comprises:

radiating light to the test wafer;

selectively extracting light reflected from each of the plurality of test positions, among light reflected from the test wafer;

acquiring a spectrum of the extracted light; and analyzing the acquired spectrum to determine a thickness of at least one of the test wafer or the test element layer.

20. The thickness estimating apparatus according to claim 1, wherein the loss function is based on a difference between an output value of the thickness predicting model generated by the machine learning and a set target output value.

\* \* \* \* \*